(12) United States Patent
Kanatani et al.

(10) Patent No.: US 7,032,441 B2
(45) Date of Patent: Apr. 25, 2006

(54) TIRE-STATE OBTAINING APPARATUS

(75) Inventors: Masaki Kanatani, Okazaki (JP); Atsushi Ogawa, Toyota (JP); Takashi Doi, Toyota (JP); Shingo Urababa, Toyota (JP); Masaaki Tabata, Chiryu (JP); Hideki Kusunoki, Nishikamo-gun (JP); Kouichi Morita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 19 days.

(21) Appl. No.: 10/510,048

(22) PCT Filed: Mar. 20, 2003

(86) PCT No.: PCT/JP03/03485

§ 371 (c)(1),
(2), (4) Date: Oct. 1, 2004

(87) PCT Pub. No.: WO03/086787

PCT Pub. Date: Oct. 23, 2003

(65) Prior Publication Data

US 2005/0172707 A1    Aug. 11, 2005

(30) Foreign Application Priority Data

Apr. 12, 2002  (JP)  ............... 2002-110114

(51) Int. Cl.
*E01C 23/00*   (2006.01)

(52) U.S. Cl. ....................... 73/146

(58) Field of Classification Search ........ 73/146–146.8
See application file for complete search history.

(56) References Cited

U.S. PATENT DOCUMENTS

| | | | |
|---|---|---|---|
| 4,734,674 A | 3/1988 | Thomas et al. | |
| 5,825,286 A | 10/1998 | Coulthard | |
| 6,340,930 B1 | 1/2002 | Lin | |
| 2003/0000296 A1 | 1/2003 | Schmitt | |

FOREIGN PATENT DOCUMENTS

| | | |
|---|---|---|
| DE | 199 51 273 A1 | 6/2001 |
| EP | 1 059 177 A1 | 12/2000 |
| JP | A 7-507513 | 8/1995 |
| JP | A 8-505939 | 6/1996 |
| JP | A 9-210827 | 8/1997 |
| JP | A 10-104103 | 4/1998 |
| JP | A 10-504783 | 5/1998 |
| JP | A 11-20428 | 1/1999 |
| JP | A 2000-142044 | 5/2000 |
| JP | A 2000-233615 | 8/2000 |
| WO | WO 94/20317 A1 | 9/1994 |
| WO | WO 96/06747 A2 | 3/1996 |

*Primary Examiner*—Edward Lefkowitz
*Assistant Examiner*—Jermaine Jenkins
(74) *Attorney, Agent, or Firm*—Oliff & Berridge, PLC

(57) ABSTRACT

A tire-state obtaining apparatus operable to detect the states of tires of wheels and including (a) wheel-side devices each including a transmitter device (42), and (b) a body-side device including a receiver device operable to receive tire information from the wheel-side devices, wherein the positions of the wheels from which sets of the tire information have been transmitted are determined on the basis of the condition in which the receiver device receives the tire information. The receiver device includes a plurality of antennas oriented to receive the tire information from the respective wheel-side devices, and the wheel corresponding to the antenna having the highest intensity of reception of the tire information can be determined as the wheel from which the tire information has been transmitted, so that the antennas need not be located near the respective wheels, to identify the wheels.

28 Claims, 21 Drawing Sheets

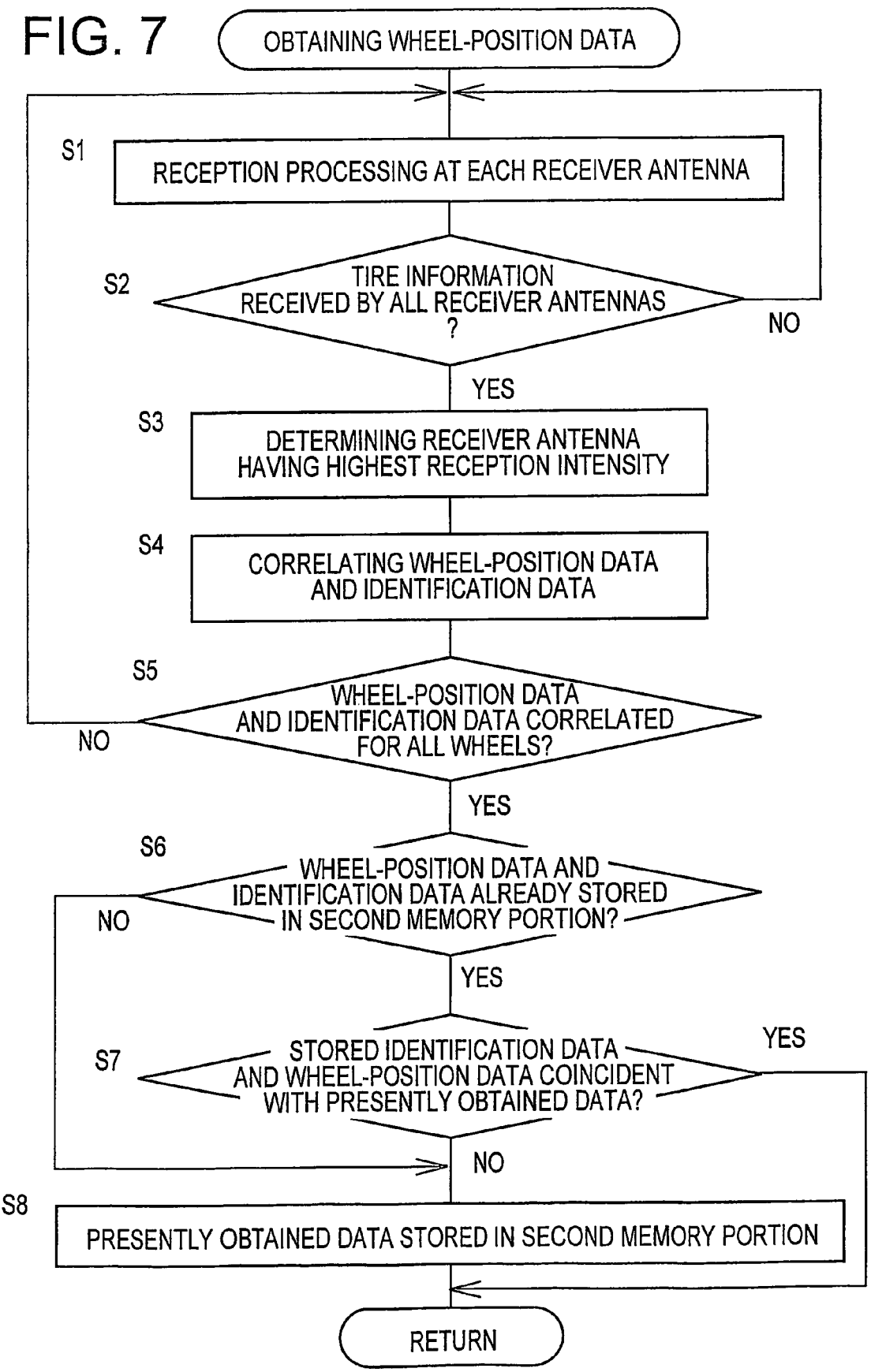

FIG. 12

| RECEIVER ANTENNA \ WHEELS | FRONT RIGHT WHEEL 10 | FRONT LEFT WHEEL 12 | REAR RIGHT WHEEL 14 | REAR LEFT WHEEL 16 | SPARE TIRE 18 |
|---|---|---|---|---|---|
| FRONT RIGHT ANTENNA 80 (No. 1) | $A_8 \sim A_9$ | $B_6 \sim B_7$ | $C_2 \sim C_3$ | $D_0 \sim D_1$ | $E_0 \sim E_1$ |
| FRONT LEFT ANTENNA 82 (No. 2) | $A_6 \sim A_7$ | $B_8 \sim B_9$ | $C_0 \sim C_1$ | $D_2 \sim D_3$ | $E_0 \sim E_1$ |
| REAR RIGHT ANTENNA 84 (No. 3) | $A_4 \sim A_5$ | $B_2 \sim B_3$ | $C_8 \sim C_9$ | $D_4 \sim D_5$ | $E_4 \sim E_5$ |
| REAR LEFT ANTENNA 86 (No. 4) | $A_2 \sim A_3$ | $B_4 \sim B_5$ | $C_4 \sim C_5$ | $D_8 \sim D_9$ | $E_4 \sim E_5$ |
| ANTENNA 88 (No. 5) | $A_0 \sim A_1$ | $B_0 \sim B_1$ | $C_4 \sim C_5$ | $D_4 \sim D_5$ | $E_8 \sim E_9$ |

170

$A_0 < A_1 \leq A_2 < A_3 \leq A_4 < A_5 \leq A_6 < A_7 \leq A_8 < A_9$ ...

FIG. 19

| ANGLE \ WHEELS | FRONT RIGHT WHEEL 10 | FRONT LEFT WHEEL 12 | REAR RIGHT WHEEL 14 | REAR LEFT WHEEL 16 | SPARE TIRE 18 |
|---|---|---|---|---|---|
| (80) $\gamma_0 \sim \gamma_1$ | $A_8 \sim A_9$ | $B_6 \sim B_7$ | $C_2 \sim C_3$ | $D_0 \sim D_1$ | $E_0 \sim E_1$ |
| (84) $\gamma_2 \sim \gamma_3$ | $A_4 \sim A_5$ | $B_2 \sim B_3$ | $C_8 \sim C_9$ | $D_4 \sim D_5$ | $E_4 \sim E_5$ |
| (88) $\gamma_4 \sim \gamma_5$ | $A_0 \sim A_1$ | $B_0 \sim B_1$ | $C_4 \sim C_5$ | $D_4 \sim D_5$ | $E_8 \sim E_9$ |
| (86) $\gamma_6 \sim \gamma_7$ | $A_2 \sim A_3$ | $B_4 \sim B_5$ | $C_4 \sim C_5$ | $D_8 \sim D_9$ | $E_4 \sim E_5$ |
| (82) $\gamma_8 \sim \gamma_9$ | $A_6 \sim A_7$ | $B_8 \sim B_9$ | $C_0 \sim C_1$ | $D_2 \sim D_3$ | $E_0 \sim E_1$ |

| | AVERAGE OF RECEPTION INTENSITY |
|---|---|
| FRONT WHEELS 10,12 | Q1 |
| REAR WHEELS 14,16 | Q0 |

| | AVERAGE OF RECEPTION INTENSITY |
|---|---|
| RIGHT WHEELS 10,14 | R1 |
| LEFT WHEELS 12,16 | R0 |

| | AVERAGE OF RECEPTION INTENSITY |
|---|---|
| FRONT RIGHT WHEEL 10 | S1 |
| FRONT LEFT WHEEL 12 | S0 |
| REAR RIGHT WHEEL 14 | S3 |
| REAR LEFT WHEEL 16 | S2 |

S0<S1<S2<S3

TIRE-STATE OBTAINING APPARATUS

TECHNICAL FIELD

The present invention relates to a tire-state obtaining apparatus which includes wheel-side devices respectively provided on a plurality of wheels of a vehicle and a body-side device disposed on a body of the vehicle, and which is arranged to obtain the states of tires of the wheels on the basis of information transmitted from the above-indicated wheel-side devices.

BACKGROUND ART

JP-A-10-104103 discloses an example of the tire-state obtaining apparatus described above. In this tire-state obtaining apparatus, each of the wheel-side devices includes (a) a tire-state detecting device operable to detect the state of the corresponding tire, and (b) a transmitter device operable to transmit a series of tire information including tire-state information indicative of the tire state detected by the tire-state detecting device, while the body-side device includes (c) a receiver device including a plurality of antennas disposed near the respective wheels, and (d) a wheel-position-data obtaining device operable to obtain wheel-position data indicative of the position of each wheel whose tire information has been received by the receiver device, such that the wheel-position data are obtained on the basis of intensities of reception of the tire information as received by the receiver device.

DISCLOSURE OF THE INVENTION

It is an object of the present invention to improve a conventional tire-state obtaining apparatus, for example, to reduce a cost of manufacture of the tire-state obtaining apparatus, and/or improve the accuracy of reception of information relating to the positions of the wheels.

This object may be achieved according to any one of the following modes of the present invention in the form of a tire-state obtaining apparatus. Each of these modes is numbered like the appended claims and depends from the other mode or modes, where appropriate, for easier understanding of the technical features disclosed in the present specification. It is to be understood that the present invention is not limited to the technical features or any combinations thereof which will be described. It is to be further understood that a plurality of elements or features included in any one of the following modes of the invention are not necessarily provided all together, and that the invention may be embodied with selected at least one of the elements or features described with respect to the same mode.

(1) A tire-state obtaining apparatus including a plurality of wheel-side devices respectively provided on a plurality of wheels of a vehicle, and a body-side device disposed on a body of the vehicle, the tire-state obtaining apparatus obtaining states of tires of the wheels on the basis of information transmitted from the wheel-side devices, characterized in that:

each of the plurality of wheel-side devices includes (a) a tire-state detecting device operable to detect the state of the tire of the corresponding wheel, and (b) a transmitter device operable to transmit a series of tire information including tire-state data indicative of the state of the tire detected by the tire-state detecting device; and the body-side device includes (c) at least one receiver device each provided commonly for at least two of the transmitter devices of the plurality of wheel-side devices and operable to receive sets of the tire information transmitted from the at least two transmitter devices, and (d) a wheel-position-related-data obtaining device operable to obtain wheel-position-related data relating to positions of the wheels, on the basis of conditions in which the at least one receiver device receives the sets of tire information transmitted from the transmitter devices.

In the tire-state obtaining apparatus according to the above mode (1) of this invention, the wheel-position-related data relating to the positions of the wheels provided with the transmitter devices from which the sets of tire information have been transmitted are obtained by the wheel-position-related-data obtaining device, on the basis of the conditions in which the sets of tire information have been received by the at least one receiver device.

Each receiver device is provided commonly for at least two of the wheels of the vehicle. That is, only one receiver device may be provided commonly for all of the wheels provided on the vehicle, or two or more receiver devices may be provided such that those receiver devices include a receiver device provided commonly for selected ones of the vehicle wheels. For example, one receiver device is provided commonly for the front right and left wheels while another receiver device is provided commonly for the rear right and left wheels. Alternatively, one receiver device is provided commonly for the front and rear right wheels while another receiver device is provided commonly for the front and rear left wheels. For example, each receiver device is arranged to include at least one receiver antenna and a reception processing portion operable to process the tire information received by each receiver antenna. In this case, a receiver antenna is provided for each of the wheels, or alternatively one receiver antenna is provided commonly for two or more wheels of the wheels provided on the vehicle. In any case, the receiver antennas are not disposed on respective portions of the vehicle body which are located near the respective wheels. Namely, even where the receiver antennas are provided for the respective wheels, each receiver antenna is not intended to receive the tire information transmitted from only the corresponding wheel, but is provided so as to receive the tire information transmitted from the other wheels as well as the corresponding wheel. Thus, each receiver antenna is located to receive the tire information from a plurality of wheels. In the conventional tire-state obtaining apparatus, on the other hand, the receiver antennas are provided for the respective wheels such that each receiver antenna is disposed on a portion of the vehicle body which is located near the corresponding wheel. Accordingly, the conventional tire-state obtaining apparatus requires signal lines connecting the respective receiver antennas and the reception processing portion, so that the number of the signal lines is equal to the number of the wheels. In addition, each signal line tends to have a relatively large length, leading to an increased cost of manufacture of the tire-state obtaining apparatus. To the contrary, the tire-state obtaining apparatus according to the above mode (1) permits reduction of the number of the signal lines connecting the receiver antenna or antennas and the reception processing portion, and/or reduction of the required length of the signal lines, resulting in significant reduction of the cost of manufacture of the tire-state obtaining apparatus.

In the present tire-state obtaining apparatus, each receiver device and the reception processing portion may be located considerably close to each other, for example, may be accommodated within a single housing according to one form of the receiver device.

The conditions in which each receiver device receives the sets of tire information from the two or more transmitter devices include an intensity of reception of the tire information by the receiver device, and a ratio of reception of the tire information by the receiver device. The condition in which each receiver device receives the tire information from a given transmitter device is influenced by the operating state of the receiver device, for example, by the reception sensitivity, an amplifying gain of an amplifier if provided in the receiver device, and a direction of orientation of the corresponding receiver antenna. Accordingly, the condition of reception of the tire information by the receiver device is preferably evaluated by taking account of the operating state of the receiver device.

The wheel-position-related data includes data directly indicative of the positions of the wheels, or data which makes it possible to determine the positions of the wheels. The position of each wheel may be an absolute or a relative position of each wheel. The absolute position may be defined in a coordinate system, while the relative position may be a position of each wheel relative to selected portions of the vehicle body, such as: front and rear portions; right and left portions; and front right, front left, rear right and rear left portions. Since the wheels are installed at the respective predetermined positions of the vehicle body, the absolute positions of the wheels can be determined by the relative positions of the wheels, once the relative positions are determined.

The position of the wheel from which the tire information has been transmitted from the transmitter device is determined on the basis of at least one of an angle of the wheel with respect to a reference line of the receiver device, and a distance of the wheel from the receiver device. Alternatively, the position of the wheel from which the tire information has been transmitted can be determined on the basis of the relative positions of the transmitter devices of the wheels. For example, it is possible to detect one of the transmitter devices which is spaced from the receiver device by the largest distance, or one of the transmitter devices whose angle with respect to the reference line of the receiver device is the largest. The position of the wheel corresponding to the thus detected transmitter device can be determined.

The intensity of reception of the tire information by the receiver device decreases with an increase in a distance between the receiver device and the corresponding transmitter device. Further, the intensity of reception of the tire information by the receiver device is higher when the direction of orientation of the receiver antenna of the receiver device (the direction in which the receiver antenna has the highest degree of directivity) is coincident with the direction in which the tire information is transmitted from the transmitter device, than when the direction of orientation of the receiver antenna is not coincident with the direction of transmission of the tire information from the transmitter device. Further, the ratio of reception of the tire information by the receiver device increases with the intensity of reception of the tire reception. The ratio of reception is a value obtained by dividing the number of operations of the transmitter device which resulted in the reception of the transmitted tire information by the receiver device, by the total number of operations of the transmitter device. Thus, the positions of the wheels from which the respective sets of tire information have been transmitted can be determined on the basis of the intensity of reception of the tire information by the receiver device, and/or the ratio of reception of the tire information by the receiver device.

The vehicle may be provided with a non-installed wheel (spare tire) which is not rotatably mounted on the vehicle body. In this case, the absolute or relative position of this non-installed wheel can be obtained by the wheel-position-related-data obtaining device. Where the non-installed wheel is disposed at a predetermined position of the vehicle body, the position of the non-installed wheel can be determined once it is determined that the wheel from which the tire information has been transmitted is the non-installed wheel. In this respect, information that the tire information has been transmitted from the non-installed wheel can be considered to be one form of the wheel-position-related data.

The wheel-position-related-data obtaining device need not be arranged to obtain the wheel-position-related data for all of the wheels provided on the vehicle, but may be arranged to obtain the wheel-position-related data for a selected one or ones of the vehicle wheels.

(2) A tire-state obtaining apparatus according to the above mode (1), wherein the tire information includes identification data identifying the wheel corresponding to the transmitter device from which the tire information has been transmitted, and the wheel-position-related-data obtaining device includes a wheel-position-related data memory portion for storing the identification data included in the tire information and the wheel-position-related data relating to the position of the wheel corresponding to the transmitter device from which the tire information has been transmitted, such that the identification data and the wheel-position-related data are correlated with each other.

In the tire-state obtaining apparatus according to the above mode (2), the wheel-position-related-data memory portion is provided to store a combination of the identification data and the wheel-position-related data in relation to each other. When the tire information is transmitted from the transmitter device of a given wheel, the position of that wheel from which the tire information has been transmitted can be determined on the basis of the identification data included in the received tire information and the wheel-position-related data.

Where the tire of a given wheel is in an abnormal state, for example, the position of this wheel whose tire is abnormal can be determined.

(3) A tire-state obtaining apparatus according to the above mode (1) or (2), wherein the wheel-position-related-data obtaining device obtains the wheel-position-related data on the basis of the conditions in which the at least one receiver device receives the sets of tire information and rotating states of the wheels.

While the vehicle is running, the relative position between the transmitter device provided on each wheel and the receiver device provided on the vehicle body periodically varies during rotation of the wheel. Namely, the intensity of reception of the tire information by the receiver device becomes highest when the distance between the receiver device and the transmitter device is the smallest, and becomes lowest when the distance is the largest. The rotating state of the wheel includes a rotating speed of the wheel, and an acceleration value of the wheel (a derivative of the rotating speed). In view of the above, it is reasonable to evaluate the condition of reception of the tire information on the basis of the rotating state of the wheel. If the condition of reception of the tire information does not vary during running of the vehicle, it is possible to determine that the wheel from which the tire information has been transmitted is the non-installed wheel.

It is noted that the wheel-position-related data may be obtained while the wheels are not rotating. In this case, it is not necessary to take account of a change in the condition of reception of the tire information due to rotation of the wheels.

(4) A tire-state obtaining apparatus according to any one of the above modes (1)–(3), wherein the transmitter device transmits the tire information for a length of time required for at least one full rotation of the corresponding wheel, and the wheel-position-related-data obtaining device obtains the wheel-position-related data on the basis of the condition in which the at least one receiver device receives the tire information transmitted from the transmitter device for the above-indicated length of time.

In the tire-state obtaining apparatus according to the above mode (4), the transmitter device of each wheel is arranged to continue transmitting the tire information for at least a time required for one full rotation of the wheel at a normal speed.

While the wheel is rotating, the distance between the receiver device and the transmitter device is determined by the distance between the receiver device and the wheel (the position of the wheel) and the angular position of the wheel, as indicated above. Accordingly, the condition of reception of the tire information (e.g., an average value of the intensity of reception of the tire information) which depends upon the distance between the receiver device and the wheel can be obtained on the basis of the tire information transmitted for the length of time required for at least one full rotation of the wheel.

Accordingly, the wheel-position-related data relating the position of the wheel can be obtained on the basis of a distribution (largest and smallest values, and an amount of change) of the intensity of reception of the tire information during one full rotation of the wheel, an average value of the intensity of reception, or a ratio of the time during which the reception intensity is higher than a predetermined threshold, for instance.

Further, the condition of reception of the tire information can be evaluated on the basis of the ratio of reception of the tire information, rather than the intensity of reception of the tire information. The condition of reception of the tire information transmitted from the non-installed wheel (spare wheel) does not change during rotation of this wheel, since the wheel is not rotated. Therefore, the wheel from which the tire information has been transmitted can be determined as the non-installed wheel when the condition of reception of the tire information does not change during rotation of the wheel.

(5) A tire-state obtaining apparatus according to any one of the above modes (1)–(4), wherein each of the at least one receiver device includes at least one receiver antenna, and the body-side device further includes an antenna-moving device operable to move at least one of the above-indicated at least one receiver antenna.

Each receiver device may include one receiver antenna, or two or more receiver antennas. Where the receiver device includes two or more receiver antennas, the antenna-moving device may be an antenna-orientation adjusting device arranged to adjust the direction of orientation of each of a selected at least one of the two or more receiver antennas, or the directions of orientation of all of the receiver antennas. The antenna-orientation adjusting device may include a common mechanism for adjusting the directions of orientation of two or more receiver antennas, or a plurality of mechanisms for adjusting the directions of orientation of the receiver antennas independently of each other.

The antenna-moving device includes at least one of (a) antenna moving means operable to move at least one receiver antenna, and (b) an antenna rotating device operable to rotate the at least one receiver antenna. The antenna moving means may be arranged to move the at least one receiver antenna along a straight line or a curved line. By moving or rotating the receiver antenna per se, the relative positions between the receiver antenna and the two or more transmitter devices can be changed. For example, the direction of orientation of the receiver antenna can be changed with respect to the two or more transmitter devices. In this sense, the antenna-moving device may be referred to as a relative-position changing device for changing the relative position between the receiver antenna and at least one transmitter device.

When the direction of orientation of the receiver antenna is coincident with the direction in which the tire information is transmitted, for example, the receiver antenna has the highest degree of intensity of reception of the tire information. Where the tire information is transmitted from one transmitter device, it is possible to confirm that the transmitter device is located on a straight line coincident with the direction of orientation of the receiver antenna, when the receiver device has the highest degree of intensity of reception of the tire information while the receiver antenna is moved or rotated by the antenna-moving device.

Each receiver antenna may take the form of a rod, a coil or a planar body. However, the receiver antenna preferably has a relatively high degree of directivity.

(6) A tire-state obtaining apparatus according to any one of the above modes (1)–(5), wherein each of the above-indicated at least one receiver device includes one receiver antenna, and the body-side device further includes an antenna-moving device operable to move the above-indicated one receiver antenna.

(7) A tire-state obtaining apparatus according to the above mode (5) or (6), wherein the antenna-moving device includes a relative-position changing device operable to change a relative position between the receiver antenna and each of said at least two of the transmitter devices, and a changing-device control portion operable to control the relative-position changing device.

The relative-position changing device includes a drive source (e.g., an electric motor) for moving or rotating the receiver antenna. As described below, the relative-position changing device is controlled by the changing-device control portion, on the basis of the rotating state of the wheel or wheels and the condition in which the wheel-position-related data are obtained by the wheel-position-related-data obtaining device. The changing-device control portion may be included in the wheel-position-related-data obtaining device.

(8) A tire-state obtaining apparatus according to any one of the above modes (5)–(7), wherein the antenna-moving device includes a moving-state changing portion operable to change a state of movement of the receiver antenna, on the basis of rotating states of the wheels.

As described above, the condition of reception of the tire information by the receiver device varies during rotation of the wheels, so that the condition of reception is preferably obtained for the length of time required for one full rotation of the wheels.

The receiver antenna is desirably positioned in a suitable area or angular range which permits good reception of the tire information transmitted from the transmitter devices during one rotation of the corresponding wheels. To increase the opportunity of reception of the tire information by the receiver antenna from the transmitter devices of the two or more wheels, the receiver antenna is desirably moved or rotated at a relatively high speed. To meet both of these two desires or requirements, the relative position between the receiver antenna and the transmitter devices is preferably changed at a speed which increases with an increase in the rotating speed of the wheels. That is, it is preferable to reduce the moving or rotating speed of the receiver antenna as the rotating speed of the wheels is lowered. As an alternative means for meeting both of the above-indicted two requirements, it is possible to intermittently move or rotate the receiver antenna such that the receiver antenna is held stationary for a predetermined time at stop positions at which the direction of orientation of the receiver antenna is coincident with the directions of transmission of the tire information from the transmitter devices, and is moved or rotated at a relatively high speed between the stop positions.

(9) A tire-state obtaining apparatus according to the above modes (5)–(8), wherein the antenna-moving device includes a moving-state changing portion operable to change a state of movement of the receiver antenna, when the wheel-position-related-data obtaining device fails to obtain the wheel-position related data of at least one of the wheels which corresponds to at least one of the above-indicated at least two of the transmitter devices.

(10) A tire-state obtaining apparatus according to any one of the above mode (8) or (9), wherein the adjusting-state changing portion is operable to change at least one of a speed and a manner of changing a relative position between the receiver antenna and each of the above-indicated at least two of the transmitter devices.

The manner of changing the relative position between the receiver device and the transmitter device may be changed by selectively effecting a continuous change and an intermittent change of the relative position. In the continuous or intermittent change, the speed at which the relative position is changed may be either constant or variable.

The relative position between the receiver device and the transmitter device may be changed at a higher speed when the rotating speed of the wheels is relatively high than when the rotating speed is relatively low. For example, the speed of changing the relative position is increased in proportion to the rotating speed of the wheels. Further, the speed of changing the relative position may be reduced, or the receiver antenna may be held stationary for a predetermined time at a position at which the direction of orientation of the receiver antenna is coincident with the direction of transmission of the tire information, when the speed of changing the relative position with respect to the rotating speed of the wheels is so high that the wheel-position-related-data obtaining device cannot obtain an entirety of the wheel-position-related data, or cannot obtain the wheel-position-related data in a satisfactory manner. By thus changing the speed of changing the relative position or holding the receiver antenna stationary at a suitable position, the wheel-position-related-data obtaining device is enabled to obtain the wheel-position-related data in a satisfactory manner.

The speed of changing the relative position between the receiver antenna and the transmitter device, and/or the manner of changing the relative position may be changed on a regular basis, or only when a predetermined condition is satisfied, for instance, when the wheel-position-related-data obtaining device fails to obtain the wheel-position-related data, as indicated above.

(11) A tire-state obtaining apparatus according to any one of the above modes (1)–(4), wherein at least one of the above-indicated at least one receiver device includes a plurality of receiver antennas, and the body-side device includes a receiver-antenna selecting device operable to select one of the plurality of receiver antennas, and a selected-antenna-dependent wheel-position-related-data obtaining portion operable to obtain the wheel-position-related data on the basis of a condition in which the receiver antenna selected by the receiver-antenna selecting device receives the tire information.

(12) A tire-state obtaining apparatus according to the above mode (11), wherein the plurality of receiver antenna are provided for the above-indicated at least two of the transmitter devices, respectively.

In the tire-state obtaining apparatus according to the above mode (12), one of the plurality of receiver antennas is selected, and the wheel-position-related data are obtained on the basis of the condition of reception of the tire information by the selected receiver antenna. Further, the receiver antennas are provided for the respective transmitter devices. The plurality of receiver antennas are preferably oriented such that the directions of orientation of the receiver antennas are coincident with the directions of transmission of the tire information from the respective transmitter devices. This arrangement permits the selected receiver antenna to receive the tire information with the highest degree of intensity.

The receiver-antenna selecting device may employ technical features of the antenna-orientation adjusting device described above. For instance, the receiver-antenna selecting device may be arranged to select one of the receiver antennas, according to the rotating state of the wheels, or the manner of selecting the receiver antenna may be changed depending upon the rotating state of the wheels.

(13) A tire-state obtaining apparatus according to the above mode (11) or (12), wherein the receiver-antenna selecting device includes a highest-reception-intensity-antenna selecting portion operable to select one of the plurality of receiver antennas which has a highest intensity of reception of the tire information.

Where the wheel-position-related data are obtained on the basis of the intensity of reception of the tire information by the receiver device, the wheel-position-related data can be obtained with a higher degree of accuracy on the basis of the tire information which has been received with a relatively high degree of intensity, than the tire information received with a relatively low degree of intensity. Where the plurality of receiver antennas are provided for the respective wheels, the wheel corresponding to the receiver antenna which has the highest intensity of reception of the tire information can be determined as the wheel from which the tire information has been transmitted.

(14) A tire-state obtaining apparatus according to any one of the above modes (1)–(4), wherein at least one of the above-indicated at least one receiver device includes a plurality of receiver antennas provided for the above-indicated at least two of the transmitter devices, respectively, and the body-side device includes a highest-reception-intensity-antenna selecting portion operable to select one of the plurality of receiver antennas which has a highest intensity of reception of the tire information.

The wheel corresponding to the receiver antenna which has the highest intensity of reception of the tire information can be considered to be the wheel from which the tire information has been transmitted. Therefore, by identifying the receiver antenna having the highest intensity of reception of the tire information, it is possible to determine the wheel from which the tire information has been transmitted.

(15) A tire-state obtaining apparatus according to any one of the above modes (1)–(14), wherein at least one of the above-indicated at least one receiver device includes one receiver antenna which has different positional relationships with the at least two wheels provided with the above-indicated at least two of the transmitter devices, respectively.

Where the receiver device is located so as to have different positional relationships with the wheels, the intensity of reception of the tire information by the receiver device can be used to obtain the wheel-position-related data relating to the wheels provided with the transmitter devices. The positional relationships of the receiver device with the transmitter devices are preferably defined or obtained by the position of the receiver device and the axes of rotation of the wheels, since the transmitter devices are rotated about the axes of rotation of the corresponding wheels.

The positional relationships of the receiver device with the transmitter devices may be represented by at least one of distances between the receiver device and the axes of rotation of the wheels, and angles of the wheels with respect to the reference lines of the receiver device. The receiver device has different positional relationships with the transmitter devices, if the transmitter devices have different values of the above-indicated distances and/or the above-indicated angles. Electromagnetic-wave shielding members arranged to absorb or attenuate electromagnetic waves may be interposed between the receiver device and the wheels (transmitter devices). Since the electromagnetic-wave shielding members may reduce the intensity of electromagnetic signal waves of the tire information transmitted from the transmitter devices, the distances between the receiver device and the wheels (transmitter devices) are preferably obtained by taking account of the reduction of the intensity of the tire information by the electromagnetic-wave shielding members. Where the receiver device is disposed intermediate between the two wheels, for instance, the receiver device has the same distance with respect to the two wheels. Where an electromagnetic-wave shielding member is interposed between the receiver device and one of those two wheels, the receiver device has a larger apparent distance with respect to that one wheel than to the other wheel. Where the receiver device includes a receiver antenna having a relatively high degree of directivity, the reference line of the receiver device may be considered to be coincident with a straight line extending in the direction in which the receiver antenna has the highest degree of directivity. Where the receiver device has different angles of its reference line with respect to the different wheels, the receiver device has different intensities of reception of respective sets of the tire information which are transmitted from the different wheels (transmitter devices) in the same condition.

(16) A tire-state obtaining apparatus according to any one of the above modes (1)–(5) and (7)–(15), wherein at least one of the above-indicated at least one receiver device includes a plurality of receiver antennas and a tire-information processing portion operable to process sets of the tire information received by the plurality of receiver antennas, and at least one of the plurality of antennas includes at least one common antenna connected to both of the tire-information processing portion and another processing portion which is operable to process information different from the tire information.

Where the wheel-position-related data are obtained on the basis of the condition of reception of the receiver antenna of the tire information, the receiver device may utilize an antenna or antennas provided for receiving information other than the tire information. Usually, the vehicle is provided with various antennas such as a vehicle navigator antenna, a broadcasting reception antenna, an electronic-key antenna, a cruising control antenna, and a roadway-surface-condition detecting antenna. By utilizing such antennas for the receiver device of the tire-state obtaining apparatus, the number of the receiver antennas exclusively used for the apparatus can be reduced, and the cost of manufacture of the apparatus can be accordingly reduce.

(17) A tire-state obtaining apparatus according to any one of the above-modes (1)–(16), wherein the wheel-position-related-data obtaining device is operable to obtain the wheel-position-related data in a selected one of different operation modes, and includes an operation-mode changing portion which is operable, when the wheel-position-related-data obtaining device fails to obtain the wheel-position-related data for at least one of the wheels in one of the different operation modes, to change the above-indicated one mode to another mode.

(18) A tire-state obtaining apparatus according to the above mode (17), wherein the operation-mode changing device includes at least one of a sampling-number changing portion operable to change a number of samples of the tire information to be received by at least one of the above-indicated at least one receiver-device; a threshold changing portion operable to change threshold values used to obtain the wheel-position-related data; a selected-wheel-data obtaining portion operable to obtain the wheel-position-related data for selected at least one of the wheels; an inhibiting portion operable to inhibit the wheel-position-related-data obtaining device from obtaining the wheel-position-related data; an amplifier-gain changing portion operable to change an amplifying gain of an amplifier included in at least one of the above-indicated at least one receiver device; an antenna adjusting portion operable to adjust at least one receiver antenna included in at least one of the above-indicated at least one receiver device; a reception-sensitivity changing portion operable to change a reception sensitivity of each of the above-indicated at least one receiver device; and a filtering-mode changing portion operable to change a mode of operation of a filter included in at least one of the above-indicated at least one receiver device.

The tire-state obtaining apparatus according to the above mode (18) is arranged such that when the wheel-position-related data cannot be obtained by the wheel-position-related-data obtaining device for any one of the wheels, at least one of the operation mode of the wheel-position-related-data obtaining device and the operating state of the receiver device is changed to permit the wheel-position-related-data obtaining device to obtain the wheel-position-related data. By changing the operating state of the receiver device, the output signal of the receiver device is changed, namely, the condition of reception of the tire information by the receiver device can be changed.

Where the wheel-position-related data are obtained on the basis of an average value of the intensity of reception of the tire information by the receiver device, or on the basis of an amount of change of the reception intensity (highest and lowest values of the reception intensity), the threshold value or values of the above-indicated average value or amount of change of the reception intensity is/are changed to change the operation mode of the wheel-position-related-data obtaining device. Even when the reception intensity of the tire information is relatively low, the wheel-position-related data can be obtained by reducing the threshold value or values. Further, the apparent ratio of reception of the tire information by the receiver device can be increased by increasing the number of samples of the tire information to be received by the receiver device, since an increase in the number of the samples increases an opportunity of the receiver device to be able to receive the tire information. Where the wheel-position-related-data obtaining device is arranged to obtain the wheel-position-related data for all of the wheels, the wheel-position-related-data obtaining device may be arranged to detect an abnormality of any transmitter device, and inhibit obtaining the wheel-position-related data for the wheel provided with the abnormal transmitter device. The wheel-position-related data can be obtained for a non-installed wheel not installed on the vehicle body, even where the wheel-position-related data cannot be obtained for wheels installed on the vehicle body. Further, it is possible to inhibit obtaining the wheel-position-related data for any wheel, where the accuracy of reception of the tire information transmitted from the transmitter device corresponding to that wheel is not sufficiently high.

The receiver device may include a filter for filtering the tire information received by the receiver antenna, an amplifier for amplifying the filtered tire information, an intermediate-frequency processor for effecting an intermediate-frequency processing of the amplified tire information, another filter for filtering the tire information processed by the intermediate-frequency processor, and a digital converting portion for comparing the thus filtered tire information with a threshold value to obtain digital tire information.

If the amplifying gain of the amplifier is increased, the amplitude of the signal of the tire information applied to the digital converting portion is increased. If the direction of orientation of the receiver antenna is adjusted to be coincident with the direction of transmission of the tire information from the transmitter device, the intensity of reception of the tire information by the receiver device is increased. If the reception intensity of the receiver device is increased, the tire information can be received by the receiver device even when the intensity of reception of the tire information is relatively slow. If the operation mode of the filter is changed, it is possible to remove a noise included in the received tire information.

(19) A tire-state obtaining apparatus including a plurality of wheel-side devices respectively provided on a plurality of wheels of a vehicle, and a body-side device disposed on a body of the vehicle, the tire-state obtaining apparatus obtaining states of tires of the wheels on the basis of information transmitted from the wheel-side devices, characterized in that:

each of the plurality of wheel-side devices includes (a) a tire-state detecting device operable to detect the state of the tire of the corresponding wheel, and (b) a transmitter device operable to transmit a series of tire information including tire-state data indicative of the state of the tire detected by the tire-state detecting device; and the body-side device includes (c) a receiver device to receive sets of the tire information transmitted from the respective transmitter devices, (d) a communication-environment detecting device operable to detect an environment of communication between the plurality of wheel-side devices and the body-side device, and (e) a wheel-position-related-data obtaining device operable to obtain wheel-position-related data relating to positions of the wheels, on the basis of the environment of communication detected by the communication-environment detecting device, and on the basis of conditions in which the receiver device receives the sets of tire information transmitted from the respective transmitter devices.

In the tire-state obtaining apparatus according to the above mode (19), the wheel-position-related-data obtaining device obtains the wheel-position-related data on the basis of the condition of reception of the tire information by the receiver device and the detected environment of communication between the wheel-side devices and the body-side device. The present apparatus provides an improvement in the accuracy of the obtained wheel-position-related data, over the prior art apparatus arranged to obtain the wheel-position-related data on the basis of only the condition of reception of the tire information.

In the present apparatus, the receiver device may include a plurality of receiver antennas disposed at respective positions on the vehicle body, which correspond to the respective wheels. It is also noted that the present apparatus may incorporate any one of the technical features of the above modes (1)–(18) which have been described.

(20) A tire-state obtaining apparatus including a plurality of wheel-side devices respectively provided on a plurality of wheels of a vehicle, and a body-side device disposed on a body of the vehicle, the tire-state obtaining apparatus obtaining states of tires of the wheels on the basis of information transmitted from the wheel-side devices, characterized in that:

each of the plurality of wheel-side devices includes (a) a tire-state detecting device operable to detect the state of the tire of the corresponding wheel, and (b) a transmitter device operable to transmit a series of tire information including tire-state data indicative of the state of the tire detected by the tire-state detecting device; and the body-side device includes (c) a receiver device to receive sets of the tire information transmitted from the respective transmitter devices, (d) a wheel-position-related-data obtaining device operable to obtain wheel-position-related data relating to positions of the wheels, on the basis of conditions in which the receiver device receives the sets of tire information transmitted from the respective transmitter devices, (e) a communication-environment detecting device operable to detect an environment of communication between the plurality of wheel-side devices and the body-side device, and (f) an operation-mode changing portion operable to change a mode of operation of the wheel-position-related-data obtaining device, on the basis of the environment of communication detected by the communication-environment detecting device.

In the tire-state obtaining apparatus according to the above mode (20), the wheel-position-related-data obtaining device obtains the wheel-position-related data, by taking account of the detected environment of communication between the wheel-side devices and the body-side device, as well as the condition of reception of the tire information by the receiver device. The present apparatus also provides an improvement in the accuracy of the obtained wheel-position-related data, over the prior art apparatus arranged to obtain the wheel-position-related data on the basis of only the condition of reception of the tire information.

The condition in which the tire information transmitted from the transmitter device is received by the receiver device is not necessarily held constant, even if the condition in which the tire information is transmitted from the transmitter device is held constant. Namely, the condition of reception of the tire information by the receiver device is influenced by the environment of communication between the wheel-side devices and the body-side device. The intensity and/or ratio of reception of the tire information by the receiver device may vary with a variation in the environment of communication. The environment of communication is considered to be good when the intensity and ratio of reception of the tire information by the receiver device are relatively high in a given condition of transmission of the tire information from the transmitter device. When the environment of communication is bad, a change of the operation mode of the wheel-position-related-data obtaining device or a change of the operating state of the receiver device makes it possible to enable the wheel-position-related-data obtaining device to obtain the wheel-position-related data, improve the accuracy of the obtained wheel-position-related data.

In the present apparatus according to the above mode (20), too, the receiver device may include a plurality of receiver antennas disposed at respective positions on the vehicle body, which correspond to the respective wheels. It is also noted that the present apparatus may incorporate any one of the technical features of the above modes (1)–(19) which have been described.

(21) A tire-state obtaining apparatus according to the above mode (19) or (20), wherein the communication-environment detecting device includes a vehicle-attitude detecting portion operable to (detect an attitude of the vehicle, and an attitude-dependent communication-environment obtaining portion operable to obtain, as the environment of communication, a variation of an actual positional relationship between the receiver device and the transmitter devices from a nominal relationship therebetween, on the basis of the attitude of the vehicle detected by the vehicle-attitude detecting portion.

The environment of communication between the receiver device and the transmitter devices changes depending upon the attitude of the vehicle. The positional relationship between the receiver device of the body-side device and the wheels when the vehicle has an inclined attitude is different from that when the vehicle has a horizontal attitude. Accordingly, the environment of communication between the receiver device and the transmitter devices changes with a change in the vehicle attitude. The vehicle attitude while the vehicle is stationary can be obtained on the basis of output signals of vehicle-height sensors for instance, and that while the vehicle is running can be estimated on the basis of the output signals of the vehicle-height sensors and/or the running condition of the vehicle. For example, it is possible to estimate that the vehicle has an almost horizontal attitude while the vehicle is running straight at an almost constant speed, and that the vehicle is inclined in its lateral direction while the vehicle is turning or cornering. It is also possible to estimate that the vehicle is inclined in its longitudinal direction while the vehicle is being braked (decelerated) or accelerated. The body of the vehicle being braked is inclined with its front portion being lowered toward the roadway surface, while the body of the vehicle being accelerated is inclined with its rear portion being lowered. The running condition of the vehicle as indicated above can be detected by at least one of a vehicle-speed sensor, a front-wheel steering-angle sensor, a rear-wheel steering-angle sensor, a steering-wheel-angle sensor, a vertical-acceleration/deceleration sensor, a lateral-acceleration/deceleration sensor, a longitudinal-acceleration/deceleration sensor, a yaw-rate sensor, a braking-force detecting device, a driving-force detecting device, etc. The degree of inclination of the vehicle irrespective of the direction of the inclination can be obtained on the basis of the angle or state of turning and the degree of braking (deceleration) or acceleration of the vehicle.

(22) A tire-state obtaining apparatus according to any one of the above modes (19)–(21), wherein the communication-environment detecting device includes a vehicle-environment detecting portion operable to detect an environment of the vehicle.

The condition of communication between the receiver device and the transmitter devices changes depending upon the environment in which the vehicle exits. The environment of the vehicle includes an environment of a space between the receiver device and each transmitter device, and presence or absence of any body or member which reflects or absorbs the tire information in the form of a radio wave. The state of the space between the receiver device and the transmitter device is influenced by the weather condition. For example, the intensity of reception of the tire information by the receiver device is lower in a rainy or snowy weather condition than in a fine weather condition. The rainy and snowy weather conditions can be estimated by the ambient temperature, humidity and barometer. The intensity of reception of the tire information is also influenced by the state of the roadway surface, which may be likely to absorb or reflect the radio wave representative of the tire information. When the vehicle is on an icy roadway surface which is highly likely to reflect the radio wave, the intensity of reception of the tire information by the receiver device is comparatively high. The vehicle is considered to be stationary or running on an icy roadway surface, when the smoothness of the roadway surface is higher than a threshold value, and/or when the friction coefficient of the roadway surface is lower than a threshold value. The intensity of reception of the tire information by the receiver device is also influenced by the ambient condition of the vehicle, such as a density of structures surrounding the vehicle, and a density of neighborhood vehicles (a degree of traffic jam), which influence the degree of reflection of electromagnetic waves. The ambient condition of the vehicle can be detected by a front radar or a rear radar, a ultrasonic-wave sensor, or a camera. The radar may employ a millimeter wave, an infrared radiation or any other form of light. The ambient condition may be obtained by manipulation of a suitable switch by the vehicle operator. Information on the traffic jam may be obtained by an inter-vehicle communication system (VICS), a broadcasting wave receiver, or a cellular or portable phone.

(23) A tire-state obtaining apparatus according to any one of the above modes (19)–(22), wherein the operation-mode changing device includes at least one of an amplifier-gain changing portion operable to change an amplifying gain of an amplifier included in the receiver device; an antenna adjusting portion operable to adjust at least one receiver antenna included the receiver device; a reception-sensitivity changing portion operable to change a reception sensitivity of the receiver device; a filtering-mode changing portion operable to change a mode of operation of a filter included in the receiver device; a threshold changing portion operable to change threshold values used to obtain the wheel-position-related data; a sampling-number changing portion operable to change a number of samples of the tire information to be received by the receiver device; a selected-wheel-data obtaining portion operable to obtain the wheel-position-related data for selected at least one of the wheels; and an inhibiting portion operable to inhibit the wheel-position-related-data obtaining device from obtaining the wheel-position-related data.

In some environment of communication between the receiver device and the transmitter devices, the wheel-position-related-data obtaining device may fail to obtain the wheel-position-related data in a satisfactory manner. In this case, the mode of operation of the wheel-position-related-data obtaining device is preferably changed as needed. A change of the mode of operation of the wheel-position-related-data obtaining device is interpreted to include a change from the normal mode permitting the device to obtain the wheel-position-related data, to a mode inhibiting the device from obtaining the wheel-position-related data. When the vehicle attitude has changed to a relatively large extent, when the frequency of change of the vehicle attitude is relatively high, or when the intensity of reception of the tire information by the receiver device is extremely lowered due to a bad environment of the vehicle, for example, the accuracy of the wheel-position-related data obtained by the wheel-position-related-data obtaining device is deteriorated, so that it is preferable not to obtain the wheel-position-related data.

(24) A tire-state obtaining apparatus including a plurality of wheel-side devices respectively provided on a plurality of wheels of a vehicle, and a body-side device disposed on a body of the vehicle, the tire-state obtaining apparatus obtaining states of tires of the wheels on the basis of information transmitted from the wheel-side devices, characterized in that:

each of the plurality of wheel-side devices includes (a) a tire-state detecting device operable to detect the state of the tire of the corresponding wheel, and (b) a transmitter device operable to transmit a series of tire information including tire-state data indicative of the state of the tire detected by the tire-state detecting device; and the body-side device includes (c) a receiver device to receive sets of the tire information transmitted from the respective transmitter devices, (d) a vehicle-running-condition detecting device operable to detect a running condition of the vehicle, and (e) a wheel-position-related-data obtaining device operable to obtain wheel-position-related data relating to positions of the wheels, on the basis of the running condition of the vehicle detected by the vehicle-running-condition detecting device, and on the basis of at least one of the state of the tire detected by the tire-state detecting device and a change of the detected tire state.

In the tire-state obtaining apparatus according to the above mode (24), the wheel-position-related-data obtaining device obtains the wheel-position-related data on the basis of the detected running condition of the vehicle and at least one of the detected state of the tire and a change of the detected state of the tire. The accuracy of the wheel-position-related data obtained in the present apparatus can be improved since the wheel-position-relate-data obtaining device uses not only the detected state of the tire and/or the change of the tire state but also the detected running condition of the vehicle.

When the vehicle is turned during its forward running, the air pressure of the wheel tires located on the outer side of the turning path of the vehicle is higher than that of the wheel tires located on the inner side. When the vehicle is braked, the air pressure of the front wheel tires is higher than that of the rear wheel tires. When the vehicle is accelerated, the air pressure of the rear wheel tires is higher than that of the front wheel tires. On the basis of these facts, the wheel-position-related data relating to the positions of the wheels from which the sets of tire information have been transmitted can be obtained.

While the vehicle is turning, the air pressure of the wheel tires on the outer side of the turning path of the vehicle is higher than while the vehicle is running straight, and that of the wheel tires on the inner side of the turning path is lower than while the vehicle is running straight. While the vehicle is being braked, the air pressure of the front wheel tires is higher than while the vehicle is running at a constant speed, and that of the rear wheel tires is lower than while the vehicle is running at the constant speed. On the basis of these facts, the wheel-position-related data can be obtained.

In the present tire-state obtaining apparatus, the receiver device may include a plurality of receiver antennas disposed at respective positions on the vehicle body, which correspond to the respective wheels. It is also noted that the present apparatus may incorporate any one of the technical features of the above modes (1)–(23) which have been described.

(25) A tire-state obtaining apparatus according to the above mode (24), wherein the tire information further includes air-pressure data indicative of an air pressure of the tire, and the wheel-position-related-data obtaining device includes an air-pressure-dependent wheel-position-related-data obtaining portion operable to obtain the wheel-position-related data on the basis of at least one of the air pressure of the tire indicated by the air-pressure data and a change of the air pressure.

(26) A tire-state obtaining apparatus according to the above mode (24) or (25), Wherein the vehicle-running-condition detecting device includes at least one of an accelerating-state detecting portion operable to detect an accelerating state of the vehicle, and a turning-state detecting portion operable to detect a turning state of the vehicle.

The accelerating state is interpreted to include a positive acceleration value indicative of a state of acceleration of the vehicle, and a negative acceleration value indicative of a state of deceleration of the vehicle.

BRIEF DESCRIPTION OF THE DRAWINGS

FIG. 7 is a flow chart illustrating a wheel-position-data obtaining program stored in a first memory portion of the tire-state obtaining apparatus of FIG. 1.

FIG. 12 is a view indicating a reception intensity data map stored in the first memory portion of a tire-state obtaining apparatus according to another embodiment of this invention.

FIG. 19 is a view indicating a reception intensity data map stored in the first memory portion of the tire-state obtaining apparatus of FIG. 17.

FIG. 27 is a view indicating a reception intensity data map stored in the first memory portion of the tire-state obtaining apparatus of FIG. 26.

FIG. 28 is a view indicating another reception intensity data map stored in the first memory portion of the apparatus of FIG. 26.

FIG. 29 is a view indicating a further reception intensity data map stored in the first memory portion of the apparatus of FIG. 26.

BEST MODE FOR CARRYING OUT THE INVENTION

Some embodiments of the tire-state obtaining apparatus of this invention will be described in detail by reference to the drawings.

Figure 1:
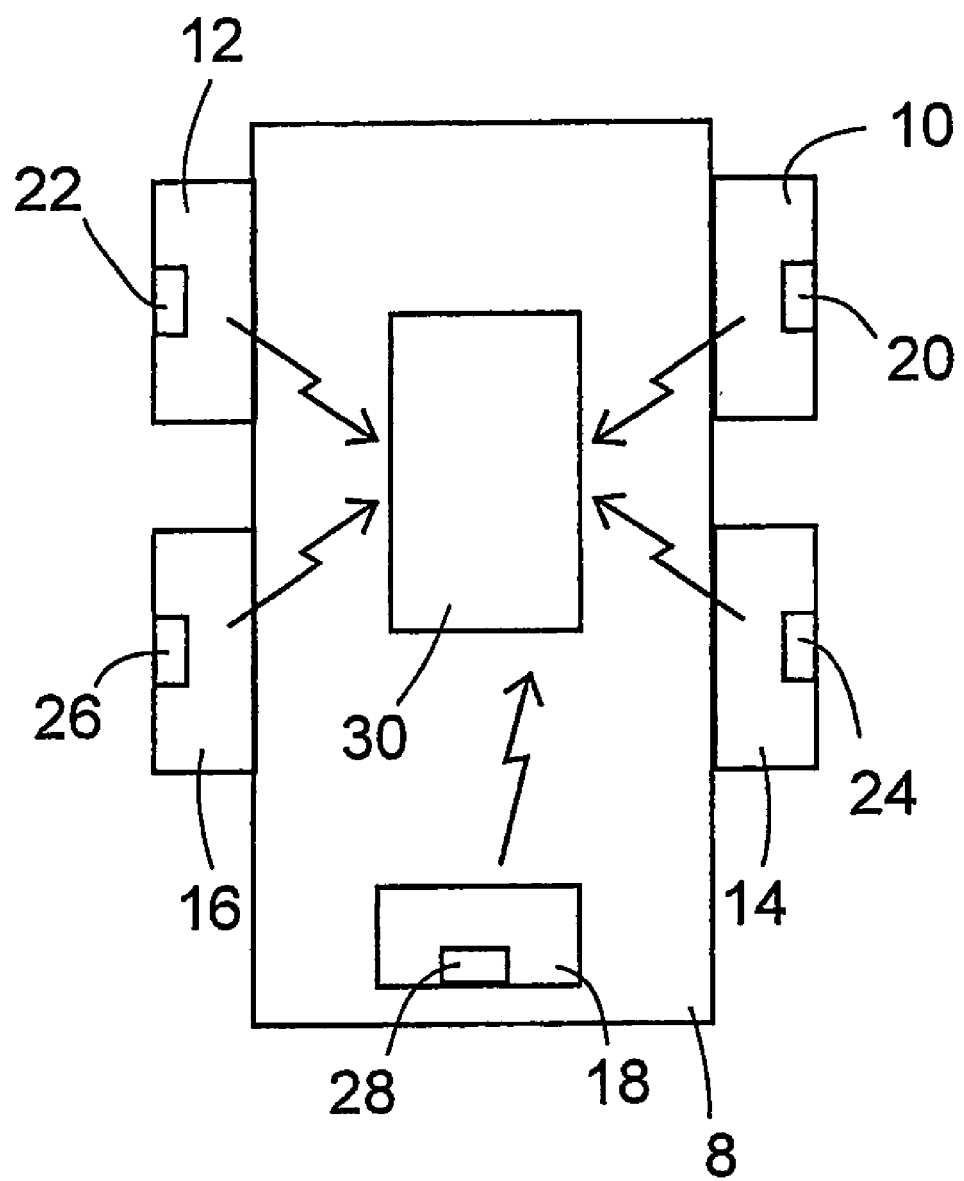
FIG. 1 is a view schematically showing a vehicle equipped with a tire-state obtaining apparatus according to one embodiment of the present invention.
Figure 2:
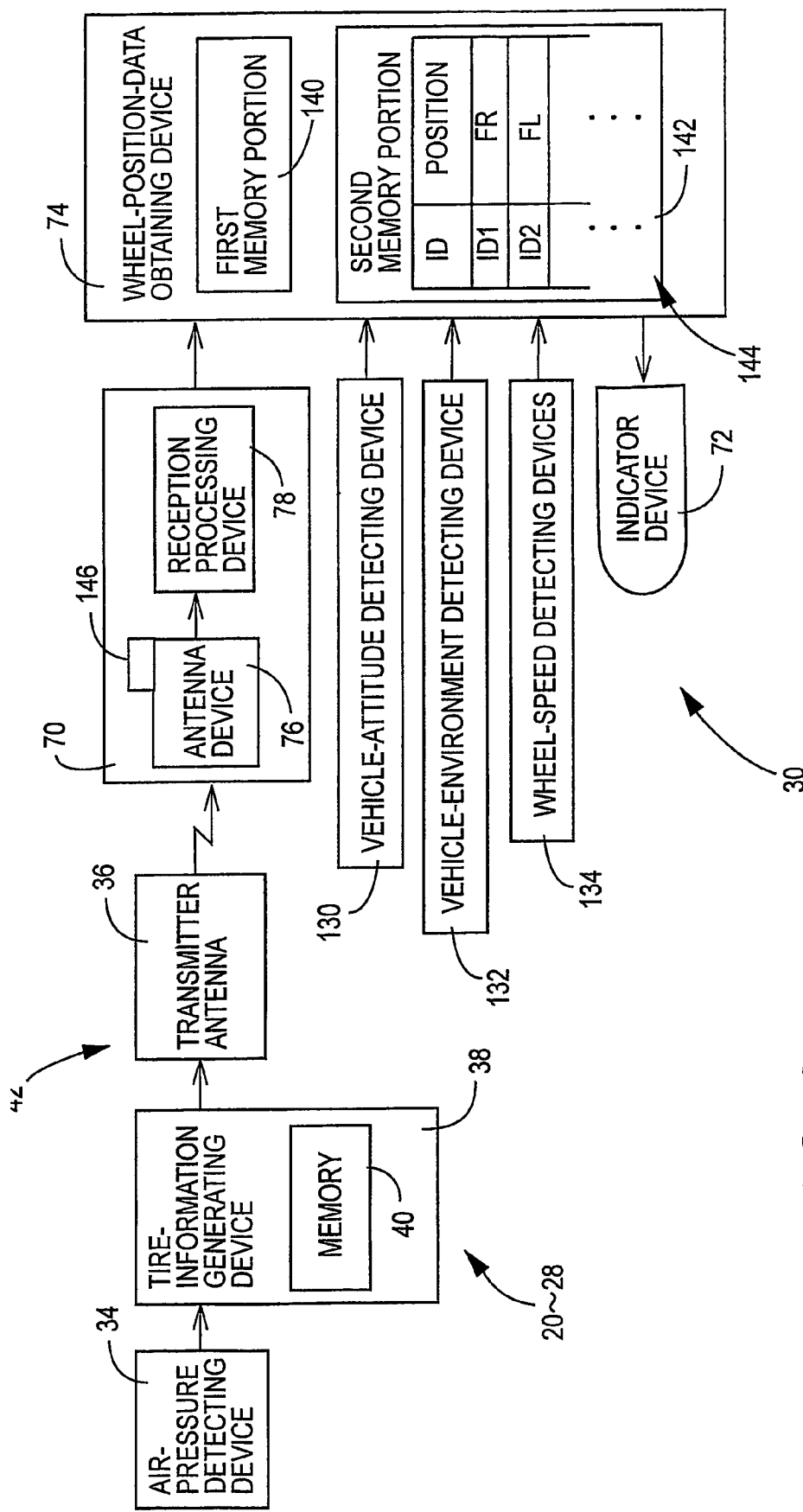
FIG. 2 is a block diagram illustrating the above-indicated tire-state obtaining apparatus.

As shown in FIGS. 1 and 2, a body 8 of an automotive vehicle is provided with a front right wheel 10, a front left wheel 12, a rear right wheel 14 and a rear left wheel 16. In a rear luggage compartment of the vehicle body 8, there is disposed a non-installed wheel 18. Each of the wheels 10–18 is tired, and is interpreted to include a metallic wheel body and a rubber tire, and the non-installed wheel 18 may be referred to as a spare wheel or tire. The wheels 10–18 are provided with respective wheel-side devices 20–28, and the vehicle body 8 is provided with a body-side device 30.

All of the wheel-side devices 20–28 have the same construction. Only the wheel-side device 20 corresponding to the front right wheel 10 will be described, by way of example. The wheel-side device 20 includes a tire-state detecting device in the form of an air-pressure detecting device 34 operable to detect an air pressure of the tire of the wheel 10, a transmitter antenna 36 arranged to transmit a series of tire information including air-pressure data indicative of the air pressure detected by the air-pressure detecting device 34, and a tire-information generating device 38 operable to generate the series of tire information. The tire-information generating device 38 includes a computer having an input-output portion connected to the air-pressure detecting device 34 and the transmitter antenna 36. The computer incorporates a memory 40 for storing identification data identifying the front right wheel 10. In the present embodiment, the tire-information generating device 38 and the transmitter antenna 36 constitute a major portion of a transmitter device 42.

While the air-pressure detecting device 34 is usually attached to the metallic body of each wheel, the detecting device 34 may be attached to the rubber tire of the wheel. Namely, the detecting device 34 may be embedded within the material of the tire or disposed within the tire.

Figure 3:
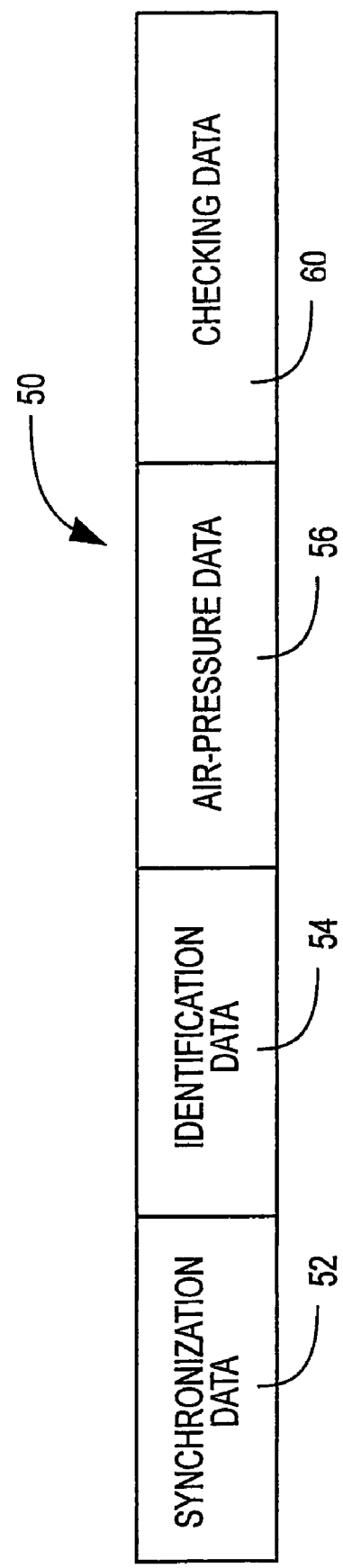
FIG. 3 is a view schematically indicating tire information.

The tire information, which is generally indicated at 50 in FIG. 3, includes synchronization data 52, the above-indicated identification data 54, the above-indicated air-pressure data 56, and checking data 60. The synchronization data 52 are leading data of the tire information 50, and are provided for synchronization between the transmitter device 42 and a receiver device 70 which will be described. The identification data 54 are provided to identify each wheel 10–18. For example, the identification data 54 included in the tire information 50 transmitted from the transmitter device 42 of the wheel-side device 20 identify the front right wheel 10. The checking data 60 are used for effecting a parity check, etc. The tire information 50 may include other kinds of data indicative of the wheel-side device 30, such as an amount of an electric energy stored in a battery. The air-pressure data 56 of the tire information 50 serve as wheel-state information indicative of the state of the wheel.

In the wheel-side device 20, the air-pressure detecting device 34 detects the air pressure of the tire of the front right wheel 10, and the tire-information generating device 38 generates the tire information 50, on the basis of the detected air pressure and the identification data of the wheel 10 stored in the memory 40. The transmitter antenna 36 transmits the generated tire information. In the present embodiment, the transmitter antenna 36 transmits the tire information at a predetermined time interval. The transmitter antennas of the wheel-side devices 20–28 for the different wheels 10–18 have respective different time intervals, so that the body-side device 30 will not concurrently receive two or more sets of the tire information from the different transmitter antennas, in principle. Even if the body-side device 30 concurrently receives two or more sets of the tire information by any chance, this concurrent reception will not take place again.

The body-side device 30 includes the above-indicated receiver device 70 arranged to receive the respective sets of the tire information from the wheel-side devices 20–28, an indicator device 72 operable to inform the vehicle operator or driver of the states of the wheel tires, and a wheel-position-data obtaining device 74.

Figure 4A:
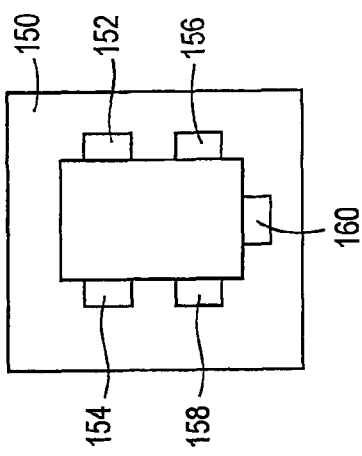
FIGS. 4A and 4B are views showing a receiver device included in the tire-state obtaining apparatus of FIG. 1.
Figure 4B:
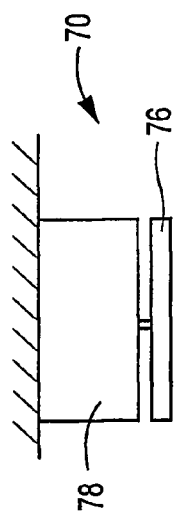

The receiver device 70 includes an antenna device 76, and a reception processing device 78 operable to process the tire information received by the antenna device 76. The receiver device 70 is disposed in an almost central part of a ceiling or roof of a driver-passenger (occupant) compartment of the vehicle. The antenna device 76 includes five receiver antennas 80, 82, 84, 86 and 88 which are oriented in respective different directions, as shown in FIG. 4. The receiver antennas 80–86 are oriented such that the direction in which each receiver antenna has the highest directivity is parallel to the direction in which the tire information is transmitted from the transmitter device 42 of the corresponding wheel (front right wheel 10, front left wheel 12, rear right wheel 14, or rear left wheel 16), the front right wheel 10 in the example of FIG. 2. The receiver antenna 88 corresponding to the non-installed wheel 18 is oriented such that the direction in which this receiver antenna 88 has the highest directivity is parallel to the direction in which the tire information is transmitted from the transmitter device of the non-installed wheel 18. Where each receiver antenna takes the form of a rod, the direction of orientation of the receiver antenna is the direction of extension of the rod.

Figure 5:
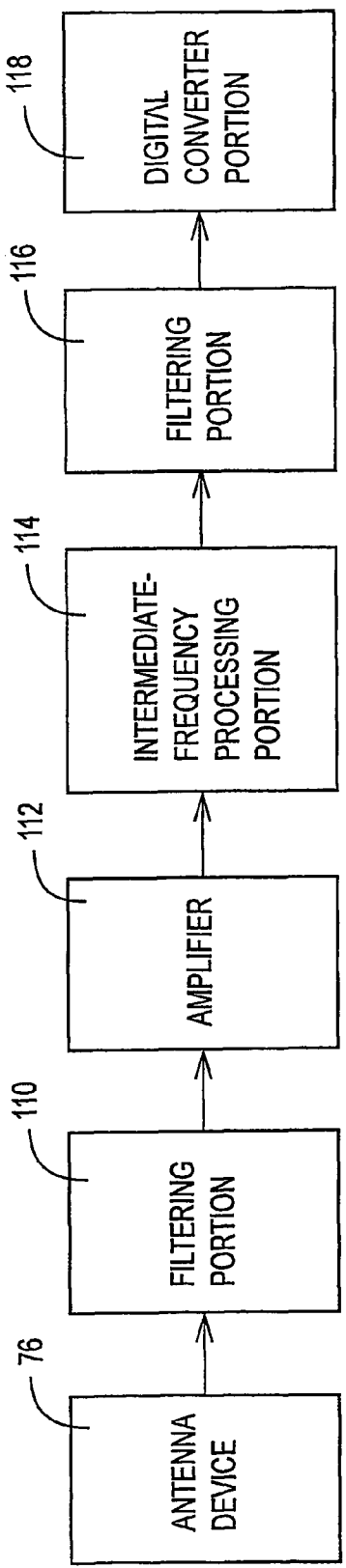
FIG. 5 is a block diagram of the above-indicated receiver device.

As shown in FIG. 5, the reception processing device 78 includes a filtering portion 110, an amplifier 112, an intermediate-frequency processing portion 114, another filtering portion 116 and a digital converter portion 118. The tire information received by the antenna device 76 is filtered by the filtering portion 110, and the thus filtered tire information is amplified by the amplifier 112. The amplified tire information is subjected to an intermediate-frequency processing, and the thus processed tire information is again filtered by the filtering portion 116. The filtered tire information is compared with a threshold value, and thereby converted into digital tire information, which is applied to the wheel-position-data obtaining device 74.

In the present embodiment, the receiver device 70 is disposed at one location within the driver-passenger compartment. The individual receiver antennas 80–88 are not disposed at respective local positions on the vehicle body 8, which are close to the respective wheels 10–18. That is, the receiver antennas 80–88 and the reception processing device 78 are all disposed close to each other on the almost central portion of the ceiling of the compartment.

The antenna device 76 consists of the five receiver antennas 80–88, which may be considered to be an array or group of antennas. Each of the receiver antennas 80–88 may be a rod-type antenna or a coil-type antenna, which has a suitable longitudinal dimension. Where the longitudinal dimension of the receiver antennas 80–88 is not so large, the antenna device 76 consisting of the receiver antennas 80–88 may be accommodated within a single casing, and the antenna device 76 and the reception processing portion 78 may be accommodated within a single housing or casing.

The wheel-position-data obtaining device 74 is principally constituted by a computer having an input-output portion to which there are connected the receiver device 70 (reception processing device 78), a vehicle-attitude detecting device 130, a vehicle-environment detecting device 132, four wheel-speed detecting devices 134 and the above-indicated indicator device 72. The vehicle-attitude detecting device 130 is arranged to detect an attitude of the automotive vehicle, and the vehicle-environment detecting device 132 is arranged to detect an environment of the vehicle. The wheel-speed detecting devices 134 are arranged to detect the rotating speeds of the respective wheels 10, 12, 14 and 16.

The wheel-speed-data obtaining device 74 is arranged to check the tire of each wheel 10–16 for an abnormal state thereof, on the basis of the tire information 50 received by the receiver device 70, and is further arranged to identify (to determine the position of) each wheel 10–18 whose tire information 50 has been received by the receiver device 70, on the basis of the condition of reception of the tire information 50 by the receiver device 70. Namely, the reception processing device 74 permits determination of the transmitter device from which the tire information 50 has been received, that is, to determine one of the front right wheel 10, front left wheel 12, rear right wheel 14, rear left wheel 16 and non-installed wheel 18, the tire information 50 of which has been received by the receiver device 70.

The wheel-position-data obtaining device 70 includes a first memory portion 140 and a second memory portion 142. The first memory portion 140 stores a plurality of programs such as a wheel-position-data obtaining program illustrated in the flow chart of FIG. 7 and an air-pressure obtaining program illustrated in the flow chart of FIG. 9.

The second memory portion 142 stores sets of identification data included in the tire information 50, and corresponding sets of position data indicative of the positions of the wheels whose sets of tire information 50 have been transmitted from their transmitter devices. The sets of identification data and the sets of position data are stored in the second memory portion 142, in relation to each other. For example, the second memory portion 142 stores a data map 144 consisting of sets of identification data (ID1, ID2, ...) and sets of position data (FR, FR ...) which correspond to the respective sets of identification data, as shown in FIG. 2.

Figure 10:
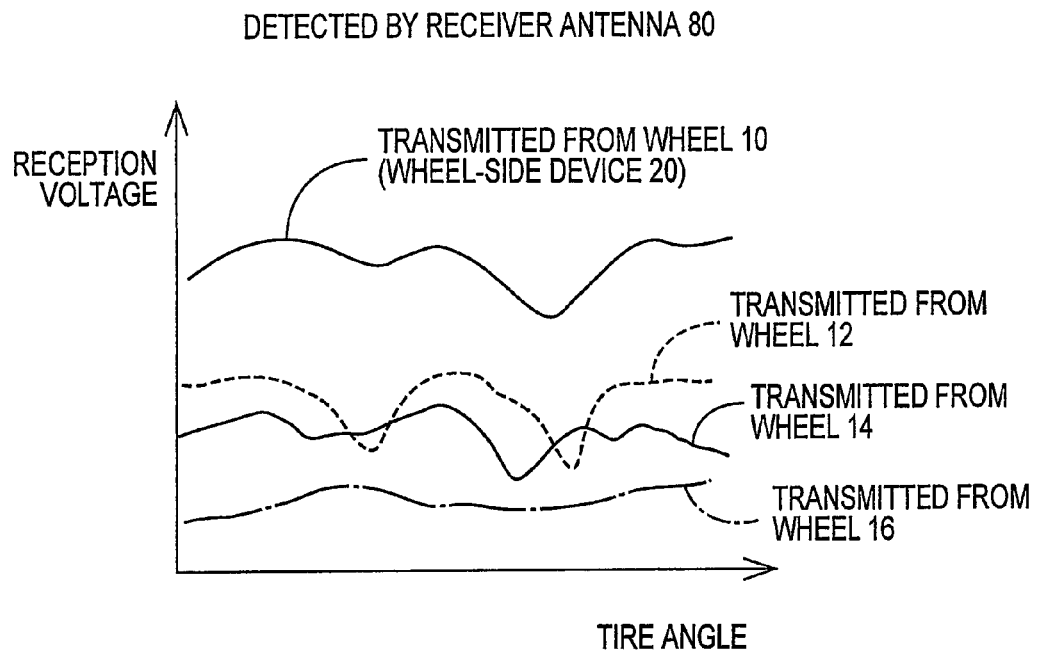
FIG. 10 is a view showing changes in reception intensity values of one of receiver antennas of the tire-state obtaining apparatus of FIG. 1.
Figure 11:
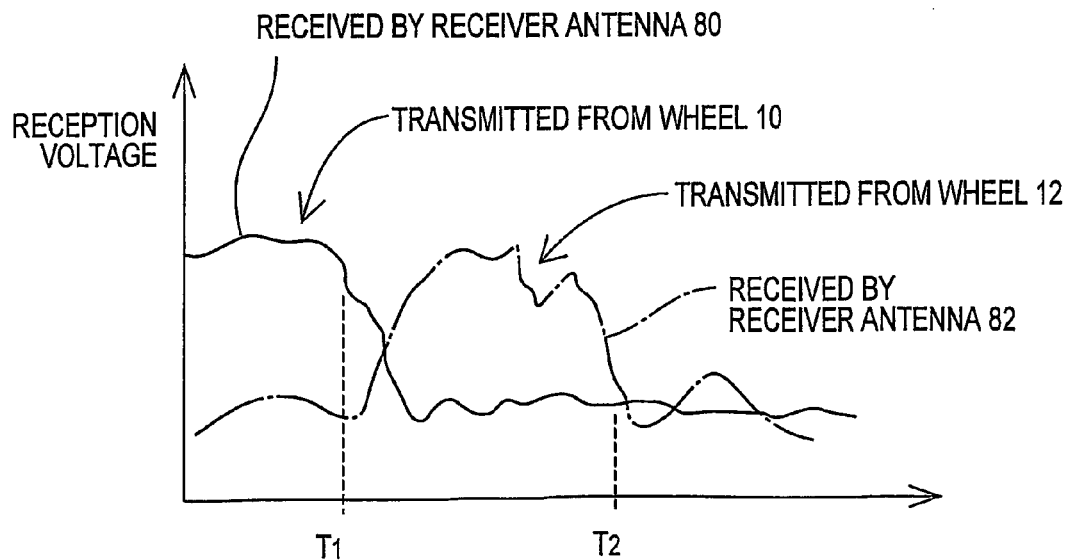
FIG. 11 is a view showing another example of changes in the reception intensity of the above-indicated receiver antenna.

If the sets of tire information 50 are concurrently transmitted from the respective wheel-side devices 20–26 of the four wheels 10–26, the receiver antenna 80 corresponding to the front right wheel 10, for example, has the highest intensity of reception of the tire information 50 from the wheel-side device 20 of the front right wheel 10, as indicated in FIG. 10. In principle, however, the sets of tire information 50 are not concurrently transmitted but are transmitted at different times from the respective wheel-side devices 20–26, as described above, so that the receiver antenna having the highest intensity of reception changes with a lapse of time. Where the tire information 50 of the front right wheel 10 is first transmitted from the wheel-side device 20, and then the tire information 50 of the front left wheel 12 is transmitted from the wheel-side device 22, as indicated in FIG. 11, for example, the receiver antenna 80 initially has the highest intensity of reception of the tire information 50, and then the receiver antenna 82 has the highest intensity of reception after the intensity of reception by the receiver antenna 80 has been considerably lowered. It will be understood that the position of the wheel from which the tire information 50 has been transmitted can be determined on the basis of the receiver antenna which has the highest intensity of reception of the tire information 50.

Figure 6:
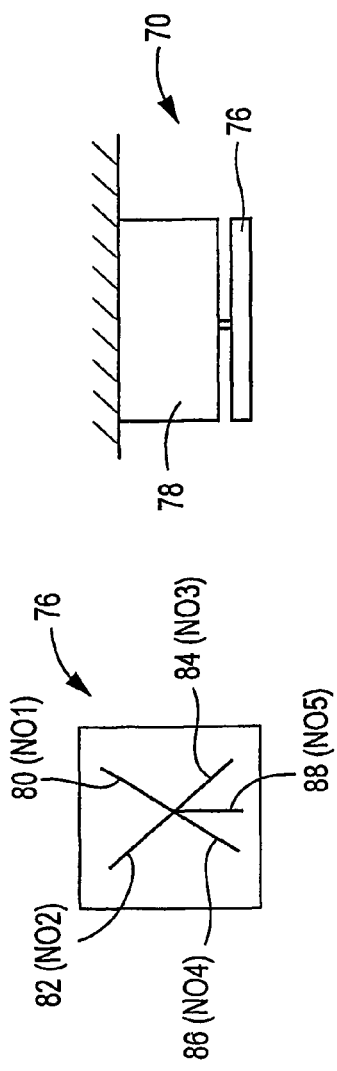
FIG. 6 is a view schematically showing an indicator device included in the tire-state obtaining apparatus of FIG. 1.

As shown in FIG. 6, the indicator device 72 includes a display 150, which is provided with five display portions 152–160 corresponding to the respective wheels 10–18. The indicator device 72 is arranged to indicate the wheel or wheels whose air pressure of the tire is lower than a predetermined lower limit.

In the present embodiment, the five receiver antennas 80–88 of the antenna device 76 are sequentially selected (sequentially made operable) to sequentially detect the reception intensity values of the received sets of tire information 50. The receiver antenna whose reception intensity is the highest is determined, and the wheel whose tire information 50 has been transmitted is determined on the basis of the determined receiver antenna having the highest reception intensity. The intensity of reception of the tire information 50 is represented by an output voltage of each receiver antenna 80–88, which is detected by a reception-intensity detecting portion 146 of the receiver device 70.

Figure 8:
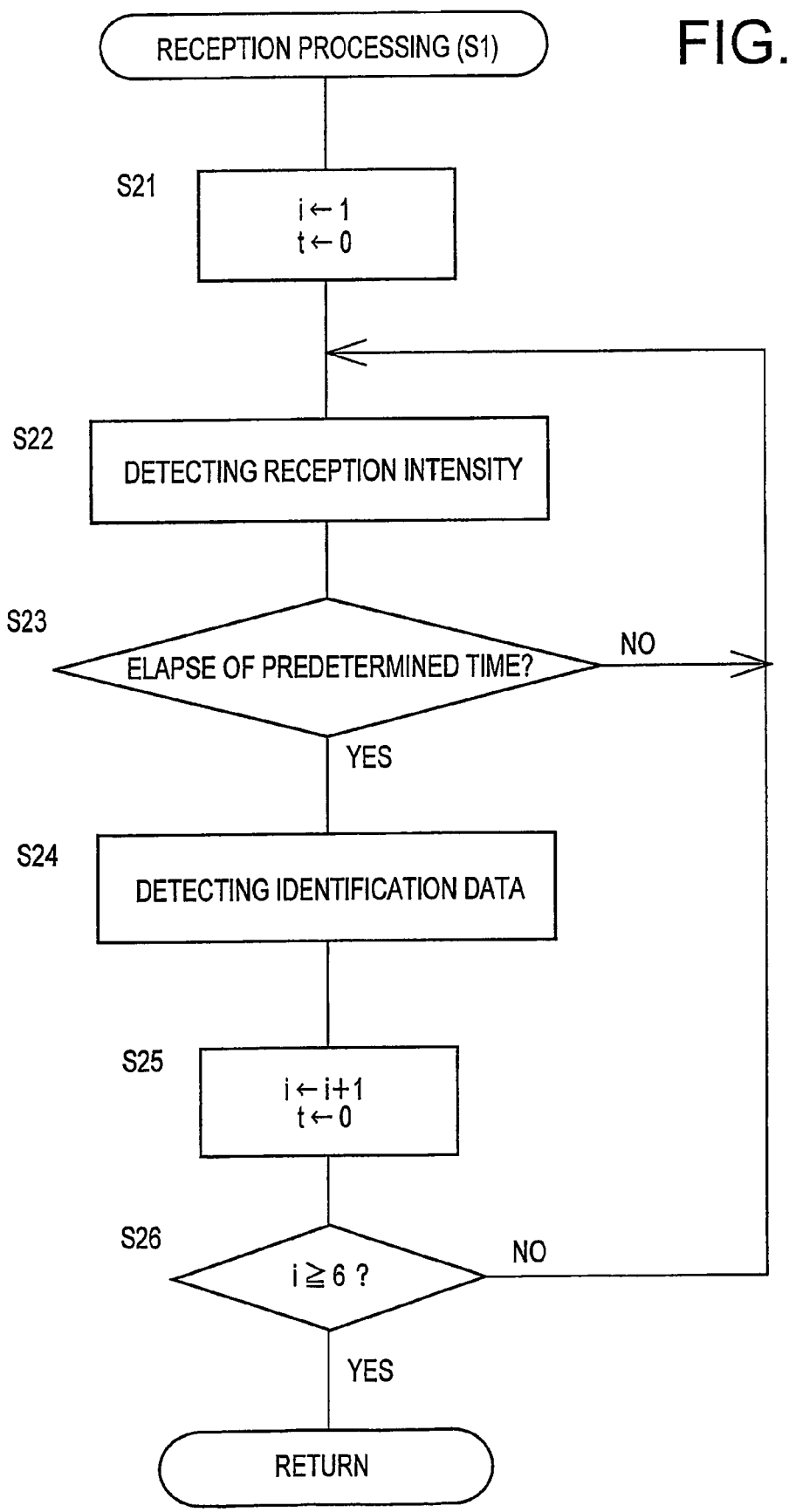
FIG. 8 is a flow chart illustrating a portion of the above-indicated wheel-position-data obtaining program.

The wheel-position-data obtaining program illustrated in the flow chart of FIG. 7 is executed with a predetermined cycle time. This program is initiated with step S1 in which a reception processing operation is performed according to a reception processing program illustrated in the flow chart of FIG. 8 is performed. Namely, the output voltage of the presently selected receiver antenna is detected for a predetermined time, and the identification data included in the received tire information 50 are obtained. Then, the control flow goes to step S2 to determine whether the reception intensity and the identification data of the tire information 50 have been detected or obtained by all of the receiver antennas 80–88. If an affirmative decision (YES) is obtained in step S2, the control flow goes to step S3 to determine a largest one of average values of the reception intensity of the five receiver antennas 80–88, and determine the receiver antenna which has the largest average value of the reception intensity. Step S3 is followed by step S4 in which wheel-position data indicative of the position of the wheel corresponding to the determined receiver antenna having the highest reception intensity are correlated with the identification data included in the tire information 50 received by that receiver antenna.

Then, the control flow goes to step S5 to determine whether the wheel-position data and the identification data have been correlated for all of the wheels 10–18. If an affirmative decision (YES) is obtained in step S5, the control flow goes to step S6 to determine whether wheel-position data have already been stored with the corresponding identification data in the second memory portion 142. This determination in step S6 is effected for each wheel 10–18. If an affirmative decision (YES) is obtained in step S6, for a given one of the wheel, the control flow goes to step S7 to determine whether the identification data and wheel-position data already stored in the second memory portion 142 are coincident with the presently obtained identification data and wheel-position data. If a negative decision (NO) is obtained in step S6 or S7, that is, if the identification data and the wheel-position data have not already been stored in the second memory portion 142, or if the stored identification data and wheel-position data are not coincident with the stored data, the control flow goes to step S8 in which the presently obtained wheel-position data are stored together with the corresponding identification data in the second memory portion 142, or the already stored wheel-position data are replaced by the presently obtained wheel-position data. The negative decision (NO) may be obtained in step S7 when the corresponding wheel 10, 12, 14 or 16 has been replaced with the non-installed wheel 18, or changed to another wheel for rotation of the wheels 10–16, for example. If an affirmative decision (YES) is obtained in step S7, that is, if the already stored identification data and wheel-position data are coincident with the presently obtained data, the identification data and the wheel-position data stored in the second memory portion 142 remain unchanged.

The flow chart of FIG. 8 illustrates the above-indicated reception processing program executed in step S1. This reception processing program, which is initiated with step S21 in which the first receiver antenna (e.g., receiver antenna 80 corresponding to the front right wheel 10) is selected, and a timer is started. Step S21 is followed by steps S22 and S23 to detect the reception intensity for the predetermined time. After the predetermined time has elapsed, that is, when an affirmative decision (YES) is obtained in step S23, the control flow goes to step S24 to read in the identification data included in the tire information 50 received by the selected first receiver antenna. Step S24 is followed by step S25 to select the second receiver antenna (e.g., receiver antenna 82) and start the timer. Step S25 is followed by step S26 to determine whether the fifth receiver antenna (e.g., receiver antenna 88) has been selected. Steps S22–S26 are repeatedly implemented until an affirmative decision (YES) is obtained in step S26. Thus, the intensity values of reception of the sets of tire information 50 received by the five receiver antennas 80–88 and the corresponding sets of identification data are obtained.

The predetermined time during which the reception intensity is detected may be longer than a length of time required for each wheel to be rotated by one full turn in an ordinary running state of the vehicle. However, the predetermined time may be shorter than the time indicated above. The time during which the wheel-position data are obtained for each wheel decreases with a decrease in the predetermined time set by the timer. For instance, the predetermined time may be determined such that all of the five receiver antennas 80–88 may be selected while the tire information 50 is being transmitted from the transmitter device 42 of one wheel-side device 20–28.

The predetermined time may be held constant or may change depending upon the wheel speed or the condition in which the wheel-position data are obtained.

The wheel-position data obtaining program may be executed with the predetermined cycle time while an ignition switch of the vehicle is held in the on state. However, the execution of the wheel-position data obtaining program in the on state of the ignition switch may be terminated after the wheel-position data and the identification data have been correlated with each other for all of the wheels 10–18. Alternatively, the wheel-position data obtaining program may be executed until statistical processing of the wheel-position data has been completed on the basis of two or more combinations of the wheel-position data sets and the identification data sets which have been repeatedly obtained for each wheel. For instance, the combinations which are identical or similar to each other may be used as an effective combination of the wheel-position data and the identification data. The wheel-position data may be obtained even while the ignition switch is held in the off state. In other words, the wheel-position data may be obtained while the vehicle is running or stationary. However, the wheel-position data can be obtained with higher accuracy in the running state of the vehicle, since it is possible to detect the reception intensities of the tire information 50 with higher accuracy, and determine the relationship between the receiver devices and the transmitter devices, with higher accuracy, while the vehicle is running.

Figure 9:
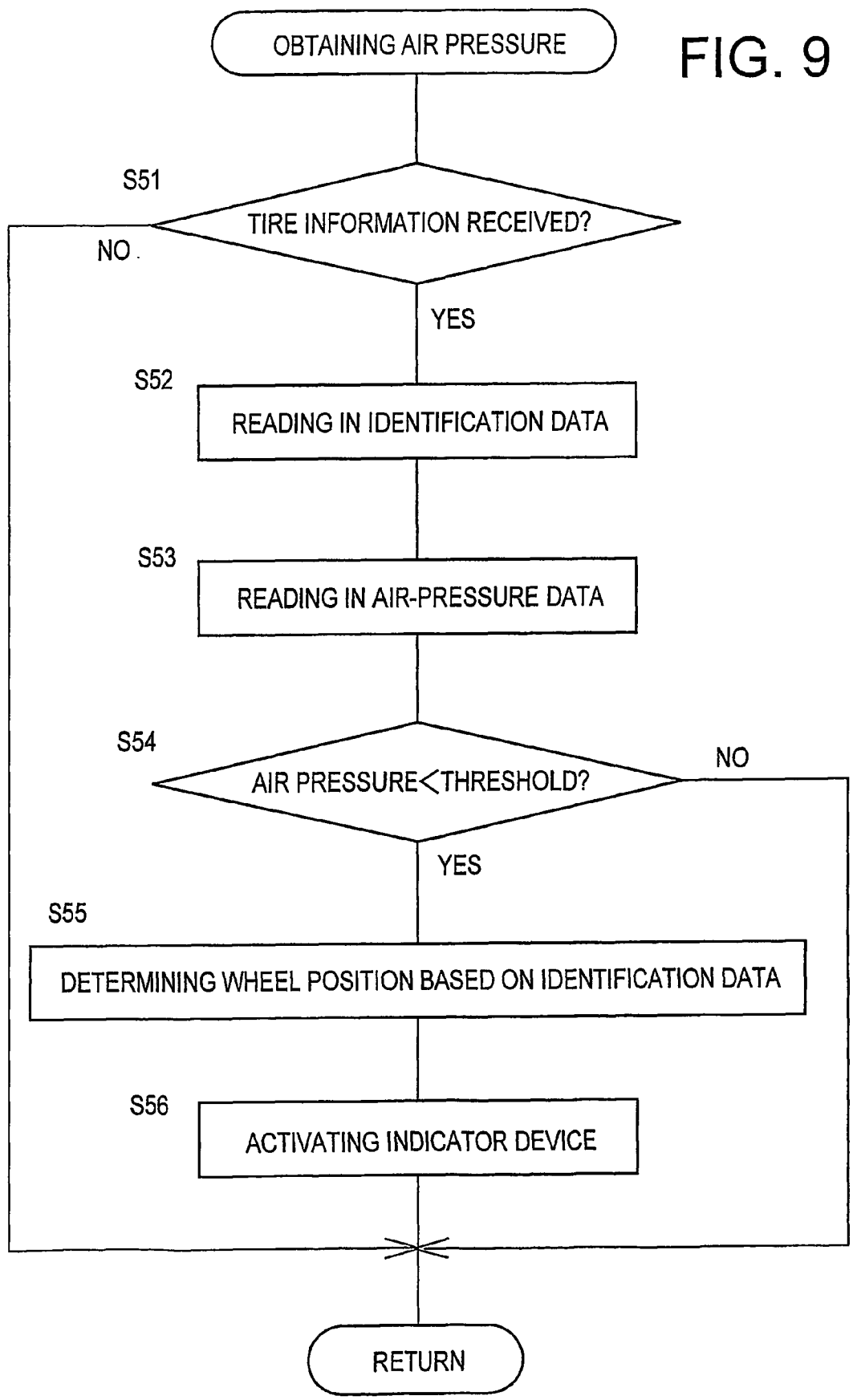
FIG. 9 is a flow chart illustrating an air-pressure detecting program stored in the above-indicated first memory portion.

The flow chart of FIG. 9 illustrates the air-pressure detecting program, which is initiated with step S51 to determine whether the tire information 50 has been received by any one of the receiver antennas 80–88. If an affirmative decision (YES) is obtained in step S51, the control flow goes to step S52 to read in the identification data, and step S53 to read in the air-pressure data also included in the received tire information 50. Then, the control flow goes to step S54 to determine whether the air pressure represented by the air-pressure data is lower than a predetermined threshold value. For example, the threshold value is determined to be a lower limit of the tire air pressure below which the corresponding wheel is required to be replaced by the non-installed wheel 18. If an affirmative decision (YES) is obtained in step S54, the control flow goes to step S55 to determine the wheel or wheels whose tire air pressure is lower than the threshold value. This determination in step S55 is made on the basis of the identification data included in the received tire information 50, and the wheel-position data and the identification data stored in the second memory portion 142. Step S55 is followed by step S56 to activate the indicator device 72 on the basis of a result of the determination in step S55. If the air pressure of the front right wheel 10 is lower than the threshold value, the display portion 152 of the display 150 provides an indication that the air pressure of the wheel 10 is lower than the threshold value.

The determination in the step S51 may be made by determining whether the intensity of reception of the tire information 50 by any receiver antenna 8—88 is higher than the predetermined threshold. In this case, the step S52 and the following steps are implemented only when the intensity of reception of the tire information 50 is determined to be higher than the threshold. This arrangement to use only the tire information 50 having a sufficiently high reception intensity permits the wheel-position data to be obtained with higher accuracy.

As described above, the present embodiment is arranged to determine or identify each wheel on the basis one of the receiver antennas 80–88 which has the highest intensity of reception of the tire information 50. If the air pressure of each wheel thus identified is lower than the predetermined threshold value, the vehicle operator or drive is informed of this wheel whose air pressure is lower than the threshold. It is also noted that the receiver antennas 80–88 are not located at respective location positions near the respective wheels 10–18, so that the required length of signal lines extending from the receiver antennas 80–88 can be shortened, leading to a reduced cost of manufacture of the tire-state obtaining apparatus.

In the present embodiment, a portion of the wheel-position-data obtaining device 74 assigned to implement step S1 (steps S21 and S25) constitutes a receiver-antenna selecting device for sequentially selecting the receiver antennas 80–88, while a portion of the wheel-position-data obtaining device 74 assigned to execute the wheel-position-data obtaining program of FIG. 7 constitutes a selected-antenna-dependent wheel-position-related-data obtaining portion or device.

While the embodiment described above is arranged to store the wheel-position data sets for all of the wheels in the second memory portion 142, after these data sets have been correlated with the corresponding identification data sets for all of the wheels, the wheel-position data set for each wheel may be stored together with the corresponding identification data set in the second memory portion 142, each time the wheel-position data set for each wheel has been correlated with the corresponding identification data set. In this case, the step S5 is eliminated, and the step S7 is not arranged to compare all of the obtained wheel-position data sets with the corresponding ones of the data map 144, but is arranged to compare only the identification data of the wheel whose wheel-position data has been obtained, with the corresponding data of the data map 144.

The manner of obtaining the wheel-position data is not limited to that in the embodiment described above. For example, the intensity values of reception of the tire information 50 by each of the five receiver antennas 80–88 are measured by experimentation, in relation to the positions of the wheels from which the tire information 50 is received. A data map representative of the thus obtained relationship between the intensity values and the wheel positions is stored in the first memory portion 140, so that the wheel-position data are obtained on the basis of the intensity values of reception represented by the data map, and the actual intensity value of reception of the tire information 50 by each receiver antenna.

An example of such relationship used in a second embodiment of this invention is represented by a data map 170 stored in the first memory portion 140, as indicated in FIG. 12. This data map 170 represents a range of the intensity of reception of the tire information 50 by each of the receiver antennas 80–88, in relation to the five wheels 10–18. This range is represented by minimum and maximum intensity values.

As shown in FIG. 10, the receiver antenna 80 exhibits the highest intensity of reception of the tire information 50 transmitted from the wheel-side device 20 of the front right wheel 10. The reception intensity values of the receiver antenna 80 with respect to the other wheels 12–18 decrease in the order of the front left wheel 12, rear right wheel 14, rear left wheel 16 and non-installed or spare wheel 18. The reception intensities of the other receiver antennas 82, 84, 86, 88 have tendencies similar to that of the receiver antenna 80. Namely, the reception intensities of each receiver antenna with respect to the different wheels 10–18 are determined by the relative position between each receiver antenna and each wheel. It is also noted that the intensity of reception of the tire information by each receiver antenna varies during rotation of each wheel, since the relative position between each receiver antenna and each wheel changes during the rotation of the wheel. However, the intensity of reception of the tire information 50 by each receiver antenna 80–88 when the tire information 50 is transmitted from each of the wheel-side devices 20–28 of the wheels 10–18 can be detected or measured by experimentation.

The data map 170 may be modified to represent an average of the intensity of reception of the tire information 50 by each receiver antenna during one full rotation of each wheel 10–16, rather than the range of the reception intensity value, or represent a reception ratio of the tire information 50. Usually, the reception ratio increases with an increase in the reception intensity value. Thus, the wheel-position data can be obtained on the basis of at least one of the reception ratio, the average value of the reception intensity during one rotation of each wheel, and the range of the reception intensity during one rotation of each wheel, of the receiver antennas 80–88 of the antenna device 76.

In the embodiments described above, one of the receiver antennas which has the highest reception intensity is determined, and the wheel-position data indicative of this receiver antenna is correlated with the identification data included in the tire information 50 received by the above-indicated receiver antenna. However, it is possible to confirm that the tire information 50 received by the receiver antenna having the highest reception intensity is in fact the tire information 50 transmitted from the wheel corresponding to that receiver antenna. This confirmation is effected by obtaining the average or range of the intensity of reception of the tire information 50 by the receiver antenna having the highest reception intensity, or the reception ratio of that receiver antenna, and comparing the thus obtained average or range of the reception intensity or reception ratio with the values of the data map 170 (or modified data map). Only after this confirmation is obtained, the wheel-position data are correlated with the corresponding identification data. In this case, the step S4 of FIG. 7 is preceded by a step of comparing the obtained average or range of the reception intensity or reception ratio with the values of the data map, to confirm that the tire information 50 received by the receiver antenna having the highest reception intensity is in fact the tire information 50 transmitted from the wheel corresponding to that receiver antenna.

The above-indicated modification to effect the confirmation by reference to the data map permits the wheel-position data to be obtained with higher accuracy.

The wheel-position-related data may be obtained on the basis of the range of the intensity of reception of the tire information 50 by each receiver antenna for a predetermined time which is determined by the rotating speed of the corresponding wheel. More precisely described, the receiver antennas 80–88 whose reception intensity is detected are sequentially selected at a predetermined time interval, which is longer than the time required for one full rotation of the wheel, so that the reception intensity of each receiver antenna is detected for a time not shorter than the time required for one full rotation of the corresponding wheel.

Figure 13:
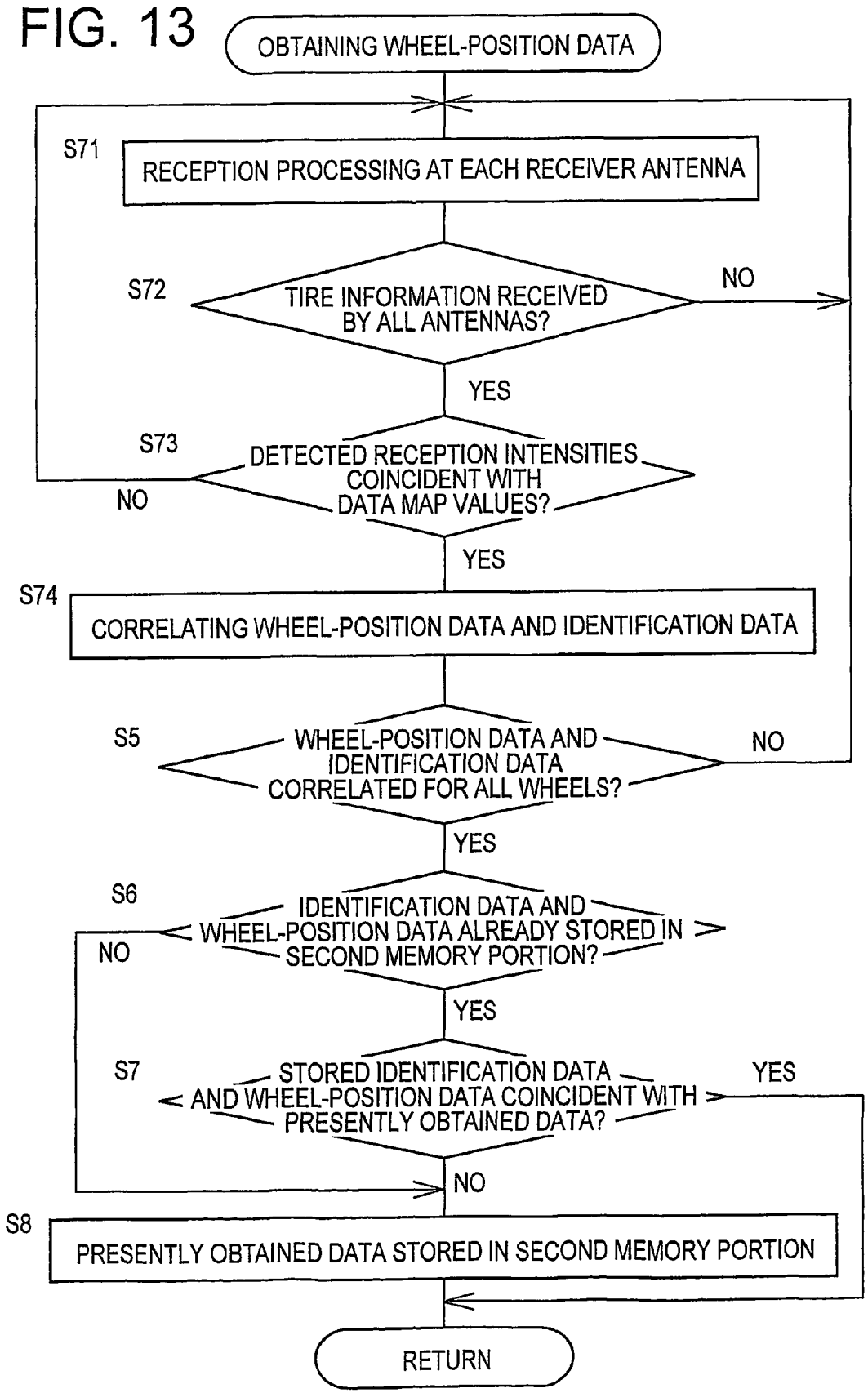
FIG. 13 is a flow chart illustrating a wheel-position-data obtaining program stored in the above-indicated first memory portion in the embodiment of FIG. 12.
Figure 14:
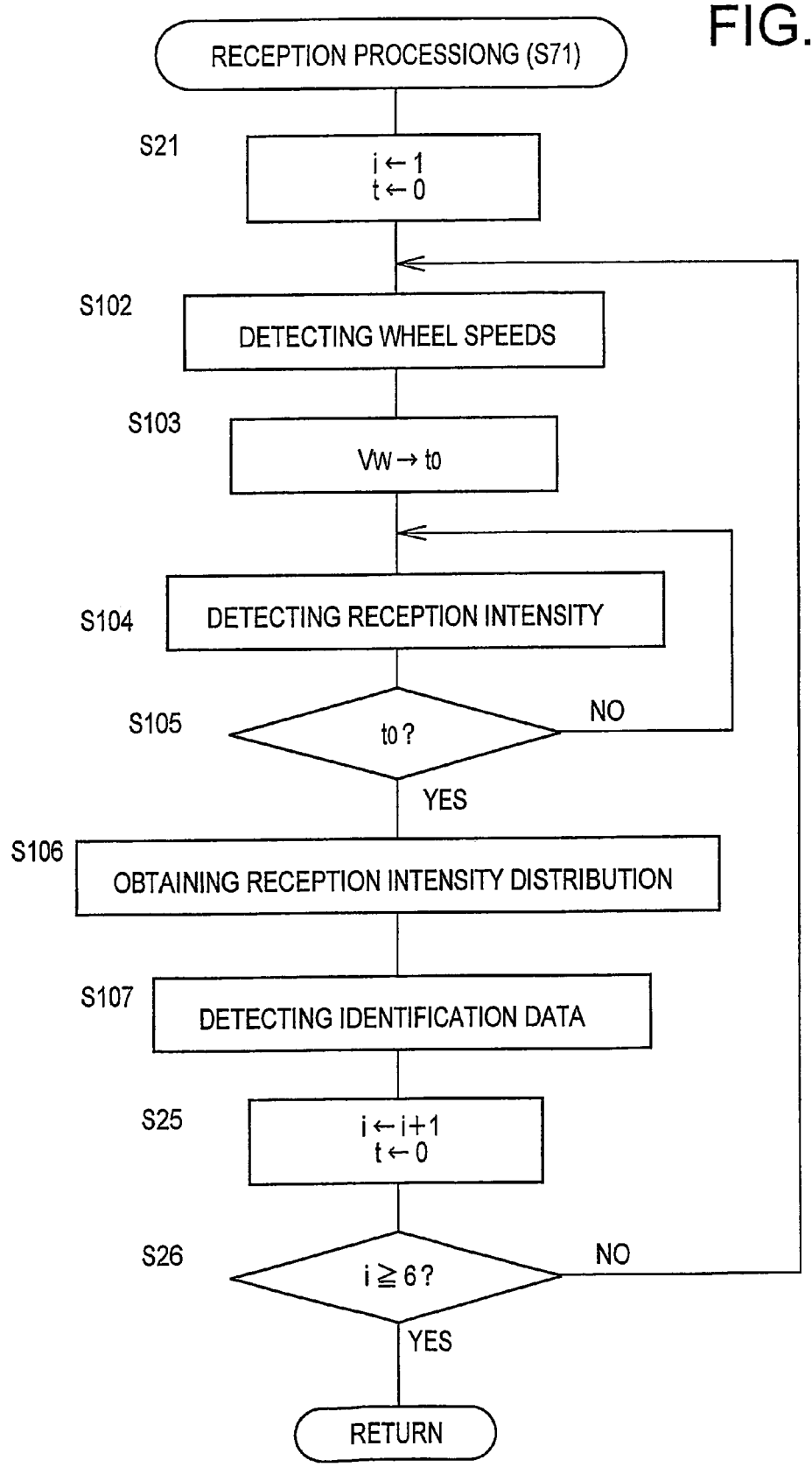
FIG. 14 is a flow chart illustrating a portion of the wheel-position-data obtaining program of FIG. 13.

The second embodiment using the data map 170 of FIG. 12 is arranged to execute a wheel-position-data obtaining program illustrated in the flow chart of FIG. 13. This program is initiated with step S71 in which a reception processing operation is performed according to a reception processing program illustrated in the flow chart of FIG. 14 is performed. Step S71 is followed by step S72 to determine whether the tire information 50 has been received by all of the receiver antennas 80–88. If an affirmative decision (YES) is obtained in step S72, the control flow goes to step S73 to determine whether the detected reception intensities are coincident with the values of the data map 170. If an affirmative decision (YES) is obtained in step S73, the control flow goes to step S74 in which the wheel-position data are correlated with the corresponding identification data.

For example, it is determined that the tire information 50 has been transmitted from the wheel-side device 24 corresponding to the rear right wheel 14, if the detected reception intensities of the five receiver antennas 80, 82, 84, 86 and 88 are held within respective ranges of C2–C3, C0–C1, C8–C9, C4–C5 and C4–C5.

The flow chart of FIG. 14 illustrates a reception processing program executed in step S71. This reception processing program, which is initiated with step S21 described above by reference to the flow chart of FIG. 8. Then, the control flow goes to step S102 to detect the wheel speed Vw, and step S103 to determine a detecting time $t_0$ on the basis of the detected wheel speeds Vw. Step S103 is followed by steps S104 and S105 to detect the reception intensity for the determined detecting time $t_0$. When the detecting time has elapsed, that is, when an affirmative decision (YES) is obtained in step S105, the control flow goes to steps S106 and S107 to obtain a distribution or change of the detected reception intensity during the detecting time, and obtain the identification data included in the received tire information. Then, the control flow goes to step S25 to select the next receiver antenna. As long as a negative decision (NO) is obtained in step S26, steps S102–S107, S25 and S26 are repeatedly implemented.

Thus, the five receiver antennas 80–88 are sequentially selected at the time interval determined by the detected wheel speed Vw, and the intensity of reception of the tire information 50 by the selected receiver antenna is detected. This arrangement permits higher accuracy of detection of the reception intensity, than where the detecting time (the time interval indicated above) is held constant as in the embodiment of FIG. 8.

The identification data and the wheel-position data may be correlated with each other each time the distribution of the reception intensity of each receiver antenna is obtained. The wheel-position data can be obtained, that is, the wheel from which the tire information 50 has been transmitted can be identified, by comparing the obtained distribution of the reception intensity with the values of the data map 170. In this case, the step S5 is eliminated, and the step S7 is arranged to compare only the identification data of the wheel whose wheel-position data has been obtained, with the corresponding data of the data map 170.

The wheel from which the tire information 50 has been transmitted can be determined on the basis of the receiver antenna which has the highest average reception intensity. This arrangement also permits high accuracy of determination of the wheel from which the tire information has been transmitted.

In the embodiment of FIG. 14, the wheel speed Vw is detected each time the receiver antenna is selected, so that the detecting time $t_0$ changes with the presently detected or updated wheel speed Vw. However, the wheel speed Vw may be detected only when the first receiver antenna is selected. In this case, the control flow goes back to step S104, rather than to step S102, when the negative decision (NO) is obtained in step S26.

The wheel speed Vw detected in step S102 may be an average of the detected speeds of all of the four wheels 10–16, or a speed obtained by processing the detected speed or speeds of at least one of the wheels 10–16 according to a predetermined rule. Alternatively, the step S102 may be formulated to detect the speed of the wheel corresponding to the presently selected receiver antenna, so that the detecting time during which the reception intensity of the selected antenna is detected is determined by the speed of the wheel corresponding to the selected receiver antenna. Further, the wheel-position data obtaining program of FIG. 13 may be modified such that the step S71 and the following steps are implemented only while the vehicle is running. In this respect, it is noted that the accuracy of detection of the reception intensity distribution is considerably lower while the vehicle is stationary.

It is possible to determine that the wheel corresponding to the receiver antenna whose reception intensity has the smallest amount of variation during one rotation of the wheel is the non-installed wheel 18. The intensity of reception of the tire information transmitted from the wheels 10–16 in a running state of the vehicle considerably varies during rotation of those wheels. On the other hand, the intensity of reception of the tire information transmitted from the non-installed wheel 18 has a considerably small amount of variation in the running state of the vehicle, since the variation of the reception intensity in question is not caused by rotation of the non-installed wheel 18 and is caused by only a vibration of the running vehicle. Therefore, the wheel corresponding to the receiver antenna whose reception intensity has the smallest amount of variation can be determined as the non-installed wheel 18.

Figure 15:
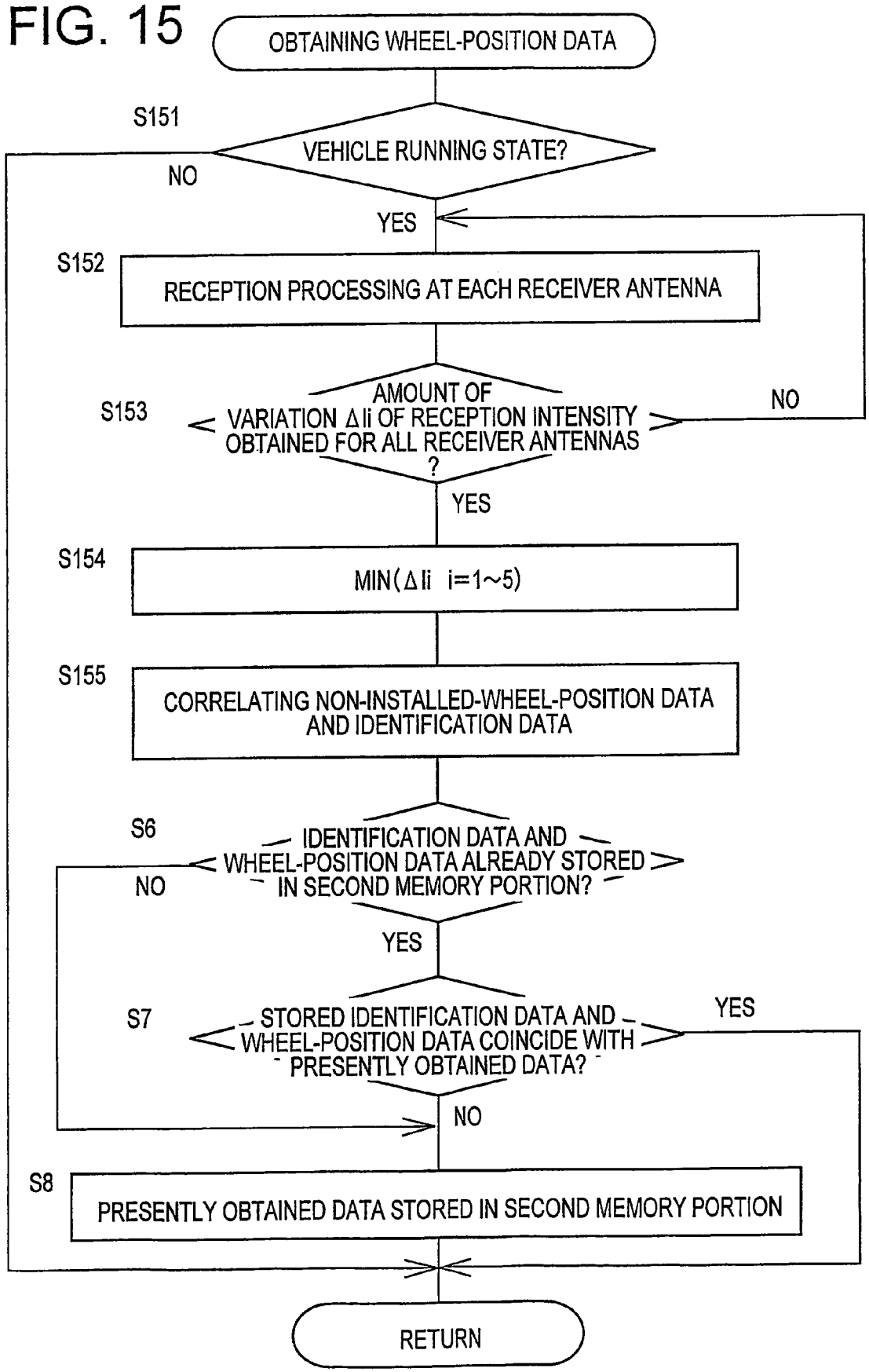
FIG. 15 is a flow chart illustrating a wheel-position-data obtaining program stored in the first memory portion in a further embodiment of this invention.

The flow chart of FIG. 15 illustrates a wheel-position data obtaining program executed in a further embodiment of this invention. This program is initiated with step S151 to determine whether the automotive vehicle is in a running state, more specifically, whether the wheel speed is higher than a predetermined threshold. In the present embodiment, the wheel-position data are generated or obtained while the wheels 10–16 are being rotated. The threshold is determined to be a speed value above which the vehicle is not considered to be stationary.

If an affirmative decision (YES) is obtained in step S151, the control flow goes to step S152 in which a reception processing operation is performed. Namely, an amount of variation ΔIi of the reception intensity (maximum amplitude ΔIi of the reception intensity waveform) of the selected receiver antenna is obtained. This operation to obtain the amount of variation ΔIi is performed after step S106 of the flow chart of FIG. 14. Then, the control flow goes to step S153 to determine whether the amounts of variation ΔIi of the reception intensity have been obtained for all of the receiver antennas 80–88. If an affirmative decision (YES) is obtained in step S153, the control flow goes to step S154 to determine a smallest one of the amounts of variation ΔIi of the reception intensity, and determine that the wheel corresponding to the receiver antenna having the smallest amount of variation ΔIi is the non-installed wheel 18.

Thus, the wheel-position data for the non-installed wheel 18 are obtained depending upon the amounts of variation ΔIi of the reception intensity of the receiver antennas.

The non-installed wheel 18 is disposed within the luggage compartment of the vehicle, so that the intensity of reception of the tire information 50 transmitted from the wheel-side device 28 corresponding to the non-installed wheel 18 is lower than those of the tire information 50 transmitted from the wheel-side devices 20–26 corresponding to the other wheels 10–16. In this respect, it is noted that a distance between the receiver device 70 and the non-installed wheel 18 is larger than those between the receiver device 70 and the other wheels 10–16. It is also noted that a shielding member functioning to shield an electromagnetic wave is usually interposed between the receiver device 70 and the non-installed wheel 18 (transmitter device 42 of the wheel-side device 28). Accordingly, the intensity of reception of the tire information 50 transmitted from the non-installed wheel 18 is lower than those of the tire information 50 transmitted from the other wheels 10–16.

In view of the above fact or tendency, the non-installed wheel 18 from which the tire information 50 has been transmitted can be identified on the basis of the reception intensity values of the receiver antennas. For instance, average values of the reception intensity of the five receiver antennas 80–88 are obtained for the predetermined detecting time, and the wheel corresponding to the receiver antenna having the smallest average value of the reception intensity is determined as the non-installed wheel 18. The average values may be replaced by values obtained by processing the detected reception intensity values according to a predetermined rule.

Further, the wheel-position data and the identification data may be correlated with each other, on the basis of the ratio of reception of the tire information 50. In this case, nominal reception ratio values are represented by a stored data map.

Figure 16:
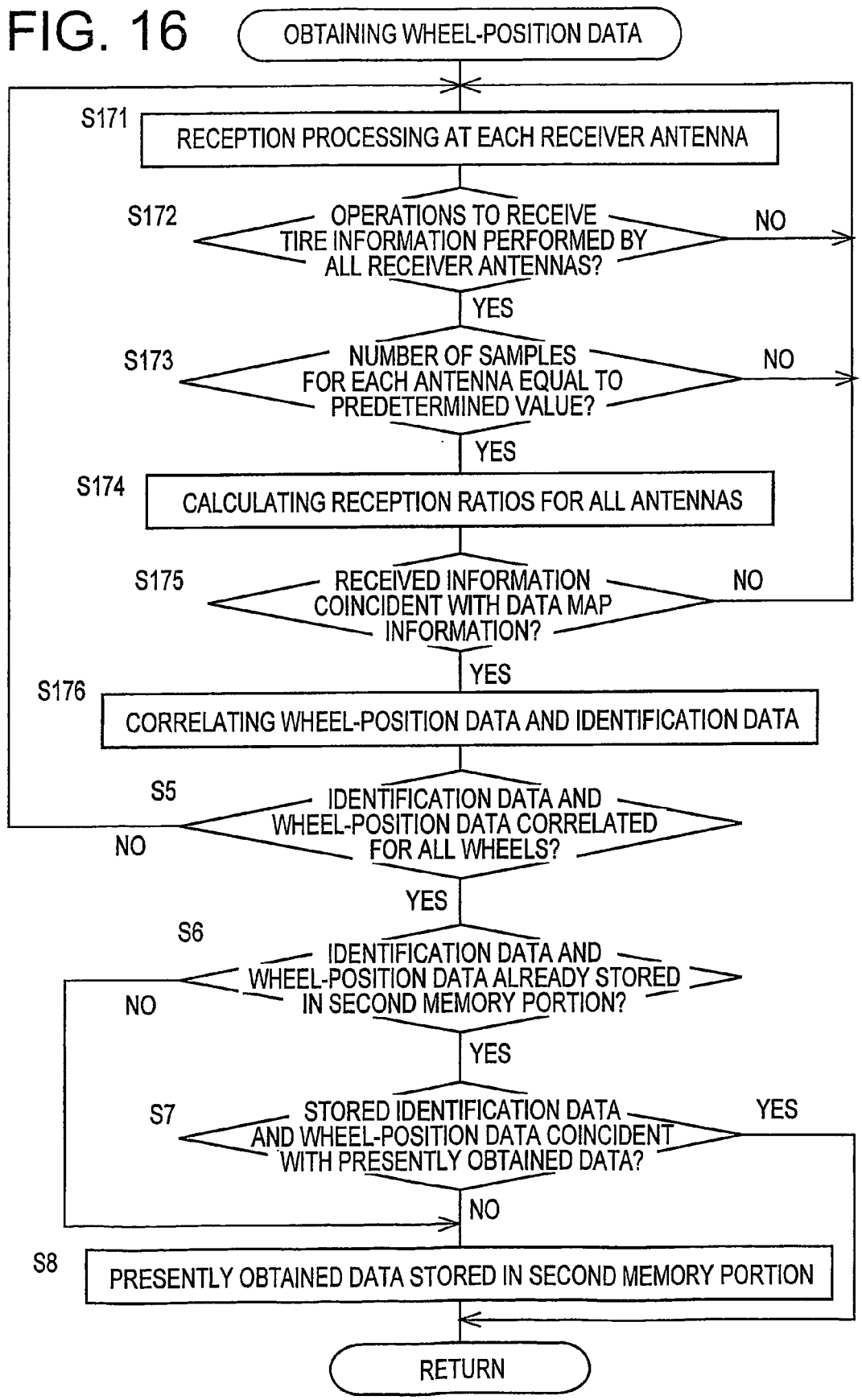
FIG. 16 is a flow chart illustrating a wheel-position-data obtaining program stored in the first memory portion in a still further embodiment of the invention.

The flow chart of FIG. 16 illustrates a wheel-position-data obtaining program according to a still further embodiment of the present invention. This program is initiated with step S171 in which a reception processing operation is performed as described above. Then, the control flow goes to step S172 to determine whether the operations to receive the tire information 50 have been performed by all of the five receiver antennas 80–88 corresponding to the respective five wheels 10–18. If an affirmative decision (YES) is obtained in step S172, the control flow goes to step S173 to determine whether the operations to receive the tire information 50 by each receiver antenna have been performed a predetermined number of times. That is, step S173 is provided to determine whether a predetermined number of samples have been obtained by each receiver antenna. This number of samples is a sum of the number of reception operations in which the tire information 50 (more precisely, at least the identification data included the tire information 50) has been actually received by the antenna in question, and the number of reception operations in which the tire information 50 (the identification data included therein) has not been actually received by the antenna. If an affirmative decision (YES) is obtained in step S173, the control flow goes to step S174 to calculate the ratio of reception of the tire information 50 by each receiver antenna. The reception ratio is calculated by dividing the number of reception operations in which the tire information 50 has been actually received, by the total number of samples. Step S174 is followed by step S175 to compare the reception ratios of the receiver antennas with the nominal values of the stored data map. If the calculated reception ratio of the antenna in question is coincident with the data map value, the control flow goes to step S176 in which the identification data and the wheel-position data are correlated with each other.

In the present embodiment, it is not essential to detect the reception intensity in step S171. Namely, the reception ratio is calculated depending upon whether at least the identification data included in the tire information 50 has been received by the antenna or not.

Figure 17:
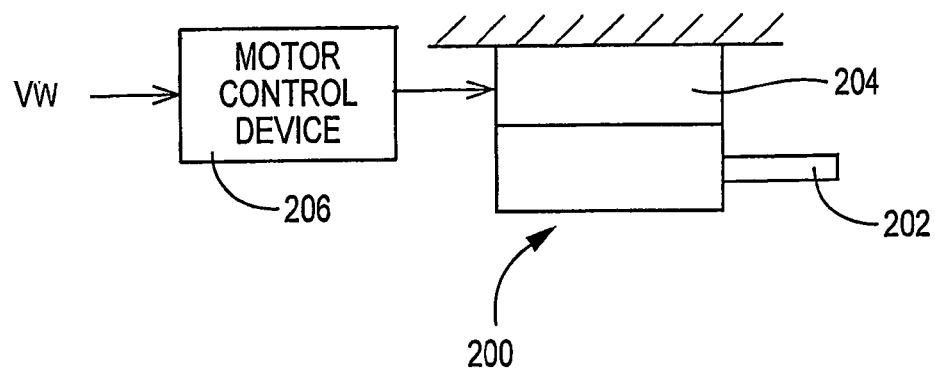
FIG. 17 is a view showing a receiver device included in a tire-state obtaining apparatus according to a yet further embodiment of this invention.

Referring next to FIG. 17, there will be described another embodiment of this invention, which employs a receiver device 200 including a single receiver antenna 202, and an electric motor 204 operable to rotate the receiver antenna 202. The electric motor 204 is controlled by a motor control device 206. However, the electric motor 204 may be controlled according to a control command received from the wheel-position-data obtaining device 74. In the present embodiment, the electric motor 204 and the motor control device 206 constitute an antenna-moving device in the form of an antenna rotating device serving as an antenna-orientation adjusting device. In the other aspects, the present embodiment is identical in construction with the first embodiment of FIG. 2.

The orientation of the receiver antenna 202 is changed by rotating the receiver antenna 202. That is, the relative position between the receiver antenna 202 and each wheel 10–18 can be changed by rotating the receiver antenna 202. Since the receiver antenna 202 is a rod-type antenna, the antenna 202 has the highest directivity in the direction of extension of its rod, which defines a reference line of the antenna 202.

Figure 18:
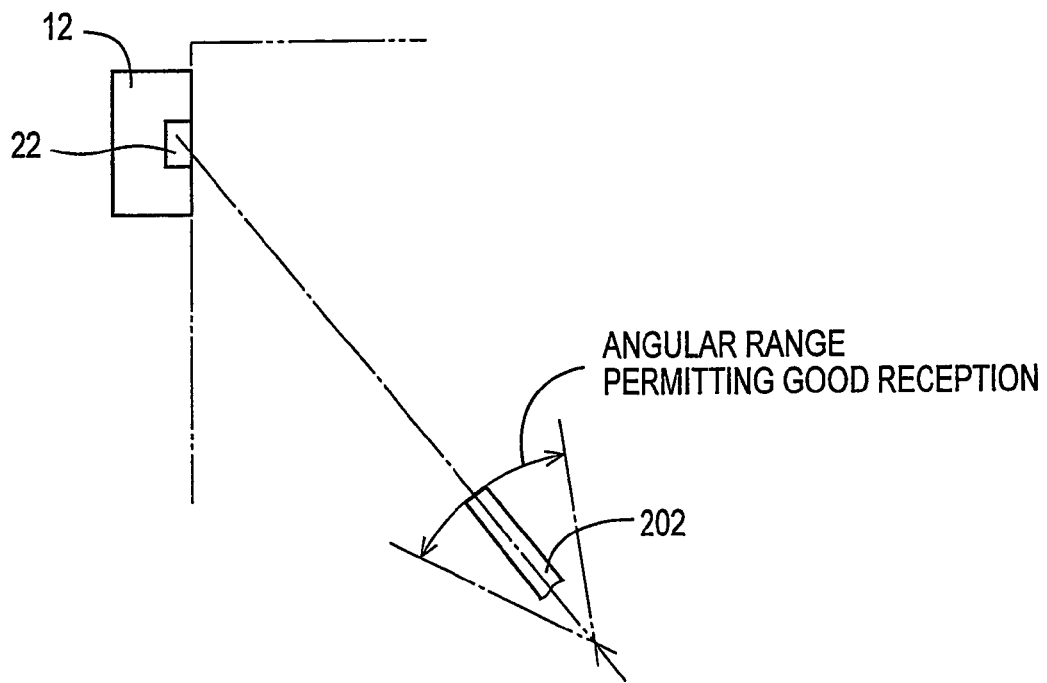
FIG. 18 is a view showing a region in which the above-indicated receiver device of FIG. 17 can receive tire information.

In the present embodiment, the receiver antenna 202 is rotated at a predetermined constant speed while the vehicle is stationary. While the vehicle is running, however, the rotating speed of the antenna 202 is changed with the rotating speed of the wheel, more precisely, is reduced with a decrease in the wheel speed, so that the tire information 50 can be received by the receiver antenna 202 during one rotation of each wheel, irrespective of a change in the wheel speed. For instance, the receiver antenna 202 is rotated by the electric motor 204, at a suitably controlled speed, so that the receiver antenna 202 is oriented within an angular range which permits good reception of the tire information 50 from each wheel during one rotation of the wheel (e.g., wheel 12), as shown in FIG. 18 by way of example.

The first memory portion 140 of the wheel-position-data obtaining portion 74 stores a data map 210 indicated in FIG. 19, in place of the data map 144 indicated in FIG. 2 or the data map 170 indicated in FIG. 12. The data map 210 indicates a relationship between a range of the rotating or swinging angle of the receiver antenna 202 and a range of the reception intensity. Where the tire information 50 is transmitted from the front left wheel 12, for example, the intensity of reception of the tire information 50 by the receiver antenna 202 varies between values B0 and B9, as the receiver antenna 202 is swung. In this specific example, it is preferred that the wheel-position data (indicative of the front left wheel 12) and the identification data are correlated with each other, on the basis of the tire information received by the receiver antenna 202 while the angle of rotation of the antenna 202 is held within a range of γ8–γ9 in which the reception intensity is in the highest range of B8–B9.

Figure 20:
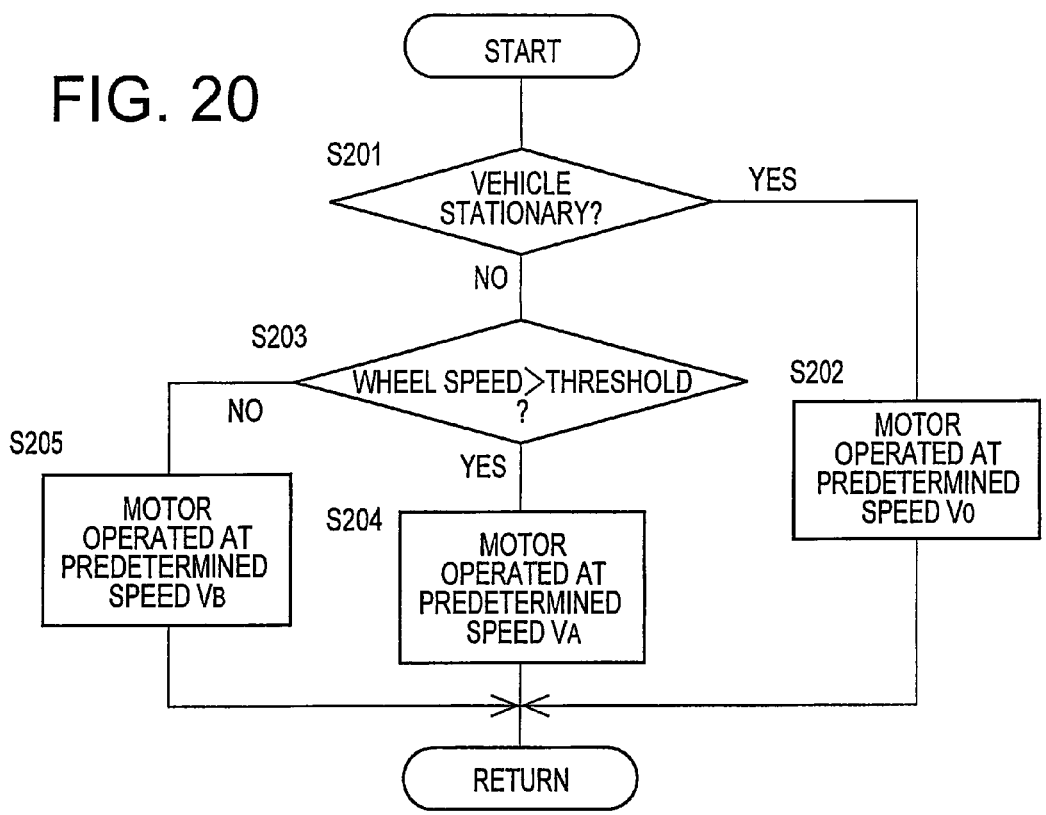
FIG. 20 is a flow chart illustrating an antenna-rotating-motor control program stored in the first memory portion in the embodiment of FIG. 17.

The flow chart of FIG. 20 illustrates an antenna-swing-motor control program for controlling the electric motor 204. This program is initiated with step S201 to determine whether the vehicle is stationary. This determination in step S201 is made on the basis of the vehicle running speed as estimated from the wheel speed. Namely, step S201 is provided to determine whether the vehicle running speed is lower than a predetermined threshold below which the vehicle is considered to be stationary. However, the vehicle running speed may be detected by a vehicle-speed detecting device, which is arranged to detect the vehicle running speed on the basis of the rotating speed of an output shaft of a vehicle drive device including a drive power source such as an engine and/or an electric motor.

If the vehicle is stationary, that is, if an affirmative decision (YES) is obtained in step S201, the control flow goes to step S202 in which the electric motor 204 is operated at a predetermined speed V0. If the vehicle is running, that is, if a negative decision (NO) is obtained in step S201, the control flow goes to step S203 to determine whether the detected wheel speed is higher than a predetermined threshold. If an affirmative decision (YES) is obtained in step S203, the control flow goes to step S204 in which the electric motor 204 is operated at a predetermined speed $V_A$. If a negative decision (NO) is obtained in step S203, the control flow goes to step S205 in which the electric motor is operated at a predetermined speed $V_B$ lower than the speed $V_A$. In the present arrangement, the intensity of reception of the tire information 50 by the receiver antenna 202 can be obtained with high stability, during one rotation of the wheel, even while the rotating speed of the wheel is relatively low.

In the present embodiment, a portion of the motor control device 206 assigned to implement steps S203–S205 of the antenna-swing-motor control program of FIG. 20 constitutes an adjusting-state changing device or portion operable to change the state of an adjustment of the antenna orientation by the antenna-orientation adjusting device described above.

In the embodiment of FIG. 20, the rotating speed of the receiver antenna 202 is changed in two steps during running of the vehicle. However, the rotating speed may be changed in three or more steps. Further alternatively, the rotating speed of the receiver antenna 202 may be changed with a change of the rotating speed of the wheel. In this case, the rotating speed of the receiver antenna 202 is continuously changed.

The rotating speed of the receiver antenna 202 may be changed only when the wheel-position data cannot be obtained by reception of the tire information 50 while the receiver antenna 202 is swung at a predetermined speed. A failure to obtain the wheel-position data usually takes place due to the rotating speed of the receiver antenna 202 which is excessively higher with respect to the rotating speed of the wheel. In this respect, the rotating speed of the receiver antenna 202 may be reduced where the wheel from which the tire information 50 has been transmitted cannot be identified in the last control cycle.

Figure 21:
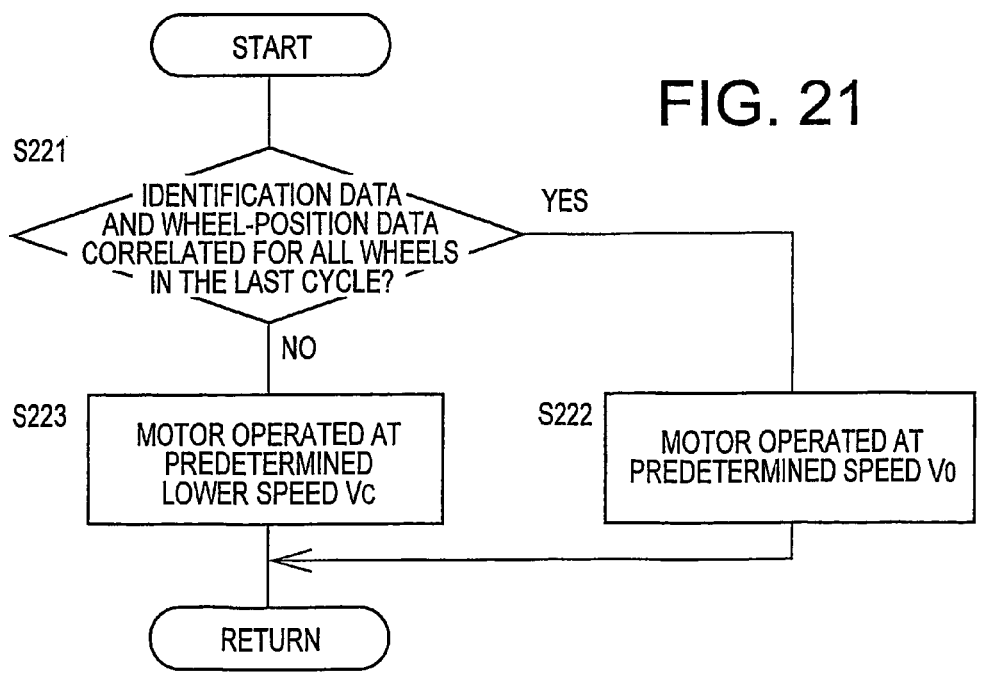
FIG. 21 is a flow chart illustrating another antenna-rotating-motor control program stored in the first memory portion in the embodiment of FIG. 17.

The flow chart of FIG. 21 illustrates an antenna-rotating-motor control program used in a further embodiment of this invention, in place of the program of FIG. 20. This program, which is executed with a predetermined cycle time, is initiated with step S221 to determine whether the wheel-position data and the identification data were correlated for all wheels in the last control cycle. If the affirmative decision (YES) was obtained in step S5, an affirmative decision (YES) is obtained in step S221, and the control flow goes to step S222 in which the electric motor 204 is operated at the predetermined normal speed $V_O$. If a negative decision (NO) is obtained in step S221, the control flow goes to step S223 in which the electric motor 204 is operated at a predetermined speed $V_C$ lower than the speed $V_O$.

In the present embodiment of FIG. 21, a portion of the motor control device 206 assigned to implement steps S221 and S223 of the flow chart of FIG. 21 also constitutes the adjusting-state changing portion, which is a part of the antenna-orientation adjusting device.

In the embodiment of FIG. 21, the rotating speed of the receiver antenna 202 is changed when the wheel-position data could not be obtained in the last control cycle. However, the wheel-state obtaining apparatus may be otherwise adjusted where the wheel-position data could not be obtained in the last control cycle. Namely, a failure to obtain the wheel-position data is not limited to inadequacy of the rotating speed of the receiver antenna 202 relative to the rotating speed of the wheel. For instance, it is possible to change at least one of the operating state of the receiver device 70, 200 and the rule for obtaining the wheel-position-related data.

Figure 22:
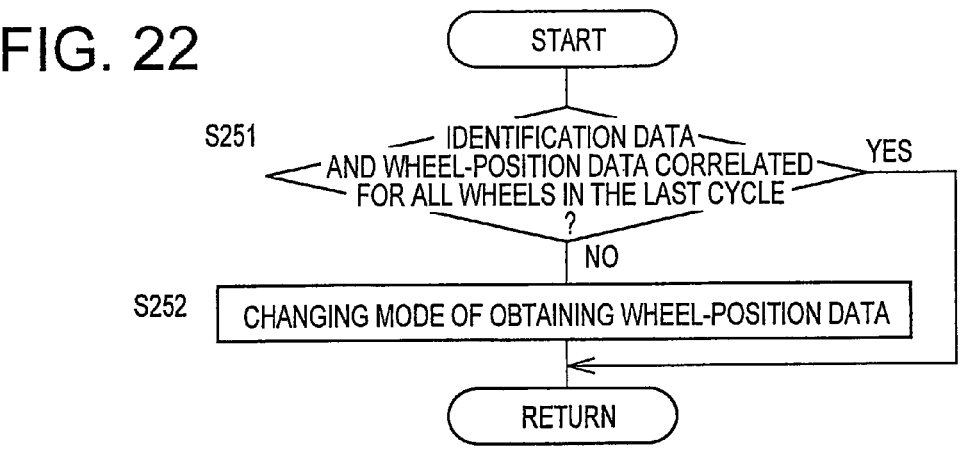
FIG. 22 is a flow chart illustrating a reception-mode changing program stored in the first memory portion of a tire-state obtaining apparatus according to still another embodiment of this invention.

An example of this modification is shown in the flow chart of FIG. 22, which illustrates a program for changing a mode of obtaining the wheel-position-related data. This program, which is executed with a predetermined cycle time, is initiated with step S251 to determine whether the wheel-position data and the identification data were correlated for all wheels in the last control cycle. If an affirmative decision (YES) is obtained in step S251, the mode of obtaining the wheel-position data is not changed. If a negative decision (NO) is obtained in step S251, the control flow goes to step S252 in which the mode of obtaining the wheel-position data is suitably changed.

For example, the mode of a filtering operation of the filtering portion 110 of the receiver device 70, 200 is changed. In this case, the step S252 corresponds to a filtering-mode changing portion operable to change the mode of the filtering operation of the filtering portion 110. For instance, the cut-off frequency of the filtering portion 110 may be changed so as to reduce the noise. Alternatively, the step S252 is formulated to increase the reception sensitivity of the receiver device 70, 200 of the tire information 50. In this case, the step S252 corresponds to a reception-sensitivity changing portion operable to change the threshold of the intensity of reception of the tire information 50 of the receiver device 70, 200. Namely, the output signal of each receiver antenna is not used when the output signal of the receiver antenna is lower than the predetermined threshold value. This threshold value of the output voltage of the receiver antenna is reduced in step S252, so that the output signal of the receiver antenna is used even when the output voltage is relatively low. Further alternatively, the step S252 is formulated to increase the amplifying gain of the amplifier 112, for increasing the amount of variation of the reception intensity. In this case, the step S252 corresponds to an amplifier-gain changing portion operable to change the amplifying gain of the amplifier 112.

The step S252 may be formulated to increase the number of samples to be received to obtain the wheel-position data, for increasing the probability of reception of the tire information 50 to increase the apparent reception ratio. In this case, the step S252 corresponds to sampling-number changing device operable to change the number of the samples. Further, the step S252 may be formulated to change the threshold values of the data map 170 or 210. If the threshold values are reduced, the wheel-position data can be obtained even where the reception intensity of the tire information 50 is relatively low due to any trouble in the communication between the transmitter device 42 and the receiver device 70, 200. In this case, the step S252 corresponds to a threshold changing portion operable to change the threshold values of the data map 170, 210. Alternatively, the step S252 is formulated such that where the wheel-position data cannot be obtained form some of the wheels, only the wheel-position data for the other wheels are obtained. For example, the intensity of reception of the tire information 50 may be extremely low for some of the wheels, where the transmitter devices 42 corresponding to those wheels have any abnormality, or where any electromagnetic-wave shielding member is interposed between those transmitter devices 42 and the receiver device 70. In this event, the wheel-position data for only the other wheels are obtained. In this case, the step S252 corresponds to a selected-wheel-data obtaining portion. For instance, the wheel-position data for only the non-installed wheel 18 are obtained where the wheel-position data for the other wheels 10–16 cannot be obtained for some reason or other. Further, the step S252 may be formulated to inhibit obtaining the wheel-position data for any wheels 10–18, under some conditions in which the obtained wheel-position data do not accurately reflect the actual states of the wheels or tires. In this case, the step S252 corresponds to an inhibiting portion operable to inhibit the wheel-position-data obtaining device 74 from obtaining the wheel-position data for any wheels 10–18.

In the embodiment of FIG. 22, a portion of the wheel-position-data obtaining device 74 assigned to implement the step S252 constitutes an operation-mode changing device operable to change the mode in which the wheel-position data are obtained.

The mode of obtaining the wheel-position data may be changed by changing at least one of the above-indicated parameters or operation particulars of the receiver device 70, 200, such as the cut-off frequency of the filtering portion 110, the amplifying gain of the amplifier 112, the threshold of the output voltage of the receiver antenna, etc., where the identification data included in the tire information 50 are not obtained. All of those parameters or operation particulars may be changed. The parameters or operation particulars to be changed may be predetermined, or determined depending upon the specific condition in which the sets of tire information 50 are received by the receiver device 70, 200. In the former case, the order in which the parameters or operation particulars are changed may be suitably predetermined.

Further, the mode in which the wheel-position data are obtained by the wheel-position-data obtaining device 74 may be changed depending upon the environment of communication between the transmitter device 42 and the receiver device 70, 200. The condition in which the receiver device 70, 200 receives the tire information 50 may vary depending upon the environment of the tire-state obtaining apparatus, even where the tire information 50 is transmitted by the transmitter device 42 in the same condition.

For example, the condition in which the receiver device 70, 200 receives the tire information 50 from the transmitter device 42 is influenced by the environment in the space between the transmitter device 42 and the receiver device 70, 200, which environment is influenced by the weather condition. For instance, the intensity of reception of the tire information 50 by the receiver device 70, 200 is lower in a rainy or snowy weather condition than in a fine weather condition. The intensity of reception is also influenced by the degree of reflection or absorption of an electromagnetic wave by the surface of the roadway on which the vehicle is running or stopped. It is known that the roadway surface has a comparatively high degree of reflectivity when the surface is iced.

For example, the rainy or snowy weather condition can be detected on the basis of the ambient temperature, humidity, atmospheric pressure, etc., while the roadway surface condition can be detected by a suitable detector, which may be arranged to detect the roughness or smoothness of the roadway surface on the basis of its reflectivity of the electromagnetic wave. Where the surface smoothness is higher than a predetermined threshold, it is determined that the roadway surface is in an icy state. The roadway surface condition may be detected on the basis of the slipping action of the vehicle wheels. The vehicle-environment detecting device 132 indicated above may include at least one of a thermometer, a hygrometer (psychrometer), a barometer and a roadway-surface-condition detector.

Where the vehicle environment (more precisely, the environment between the vehicle wheels and body) detected by the vehicle-environment detecting device 132 is determined to be relatively bad, that is, where the intensity of reception of the tire information 50 is determined to be relatively low due to bad vehicle environment, the lower limits of the ranges of the reception intensity of the data map 70, 210 are reduced with respect to the nominal values, so that the tire information 50 is used for obtaining the wheel-position data, even where the reception intensity is relatively low due to the bad environment between the transmitter device 42 and the receiver device 70, 200.

Figure 23:
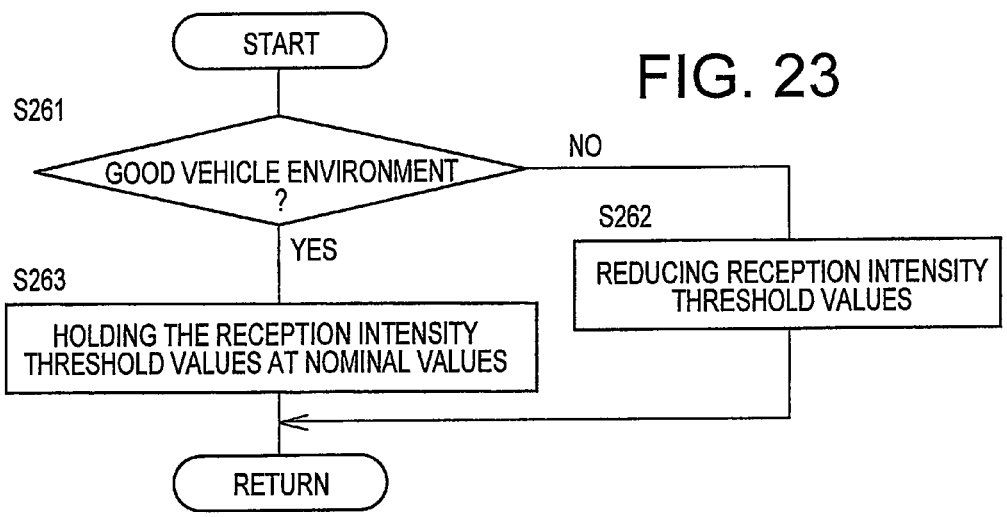
FIG. 23 is a flow chart illustrating an environment-dependent threshold changing program stored in the first memory portion of a tire-state obtaining apparatus according to yet another embodiment of this invention.

The flow chart of FIG. 23 illustrates an example of a program for changing the lower limits of the reception intensity of the data maps 170, 210 depending upon the detected vehicle environment. This program is initiated with step S261 to determine whether the detected vehicle environment (environment of communication between the transmitter and receiver devices) is acceptably good. If a negative decision (NO) is obtained in step S261, the control flow goes to step S262 to reduce the upper and lower limits of the ranges of the reception intensity of the data map 170, 210, by a predetermined amount with respect to the nominal values. If an affirmative decision (YES) is obtained in step S261, the control flow goes to step S263 to hold the upper and lower limits at the nominal values. In step S261, a threshold value is used for determining whether the detected vehicle environment is acceptably good. This threshold value is determined such that the vehicle environment is considered to be normal or acceptably good when the value indicative of the detected vehicle environment is higher than the threshold value.

It will be understood that the vehicle-environment detecting device 132 and a portion of the wheel-position data obtaining device 74 assigned to implement steps S261 and S261 of the flow chart of FIG. 23 cooperate to constitute a communication-environment detecting device operable to detect an environment of communication between the wheel-side devices 20–28 and the body-side device 30.

The upper and lower limits of the data map 170, 210 may be reduced by an amount which varies with the detected communication environment. The step S262 may be modified not to change the upper and lower limits of the reception intensity of the data map 170, 210, but to change the parameters or operation particulars of the receiver device 70, 200, such as the cut-off frequency of the filtering portion 110 and the number of samples, as described above with respect to the step S262 in the embodiment of FIG. 22. Further, the step S263 may be formulated so as to inhibit the wheel-position-data obtaining device 74 from obtaining the wheel-position data, if the detected communication environment (vehicle environment) is relatively bad.

The environment of communication between the transmitter device 42 and the receiver device 70, 210 may also be influenced by the attitude or inclination of the vehicle. That is, the relative position between the transmitter device 42 and the receiver device 70, 200 changes with the angle of inclination of the vehicle body 8 relative to the horizontal plane. Accordingly, the intensity of reception of the tire information 50 by the receiver device 70, 200 may change with the angle of inclination of the vehicle body 8, even when the intensity of transmission of the tire information 50 from the transmitter device 42 is held constant.

When the vehicle body 8 has an almost horizontal attitude while the vehicle is stationary, or when the vehicle body 8 can be considered to have an almost horizontal attitude while the vehicle is running straight at a substantially constant speed, for example, the upper and lower limits of the ranges of the reception intensity of the data map 170, 210 are held at the nominal values. When the vehicle body 8 is inclined relative to the horizontal plane while the vehicle is stationary, or when the vehicle body 8 can be considered to be inclined while the vehicle is turning, braked or accelerated, for example, the upper and lower limits of the ranges of the reception intensity of the data map 170, 210 are increased or reduced depending upon the direction and angle of the inclination of the vehicle body 8. The upper and lower limits are reduced when the distance between the transmitter device 42 and the receiver device 70, 200 is increased due to the inclination of the vehicle body 8, and are increased when the distance is reduced due to the inclination.

The amount of change of the vehicle body attitude tends to be relatively large while the vehicle is running on a bad roadway surface, when the braking and acceleration of the vehicle are alternately repeated, or when the amount of change of the steering angle is relatively large. In these cases, it may be better not to obtain the wheel-position data. Where the transmitter device 42 is arranged to transmit the tire information 50 at a relatively high frequency, however, the intensity of reception of the tire information 50 at a varying angle of inclination of the vehicle body can be obtained with a relatively high degree of accuracy, permitting the wheel-position-data obtaining device 74 to obtain the wheel-position data with relatively high reliability.

The attitude of the vehicle body 8 can be obtained on the basis of output signals of vehicle height sensors provided between the respective wheels 10–16 and the vehicle body 8. The vehicle body attitude may be estimated on the basis of the detected running condition of the vehicle. For example, a determination as to whether the vehicle is turning or not may be made on the basis of the steering angle of the vehicle as detected by a suitable steering-angle sensor, and a determination as to whether the vehicle is braked or accelerated may be made on the basis of the detected or calculated braking force or driving force applied to the wheels 10–16 or the drive wheels. That is, the vehicle-attitude detecting device 130 may include at least one of a vehicle-height sensing device, a front-wheel steering-angle sensor, a rear-wheel steering-angle sensor, a steering-wheel-angle sensor, a yaw-rate sensor, a lateral-acceleration/deceleration sensor, a longitudinal-acceleration/deceleration sensor, a braking-force detecting device and a driving-force detecting device.

Figure 24:
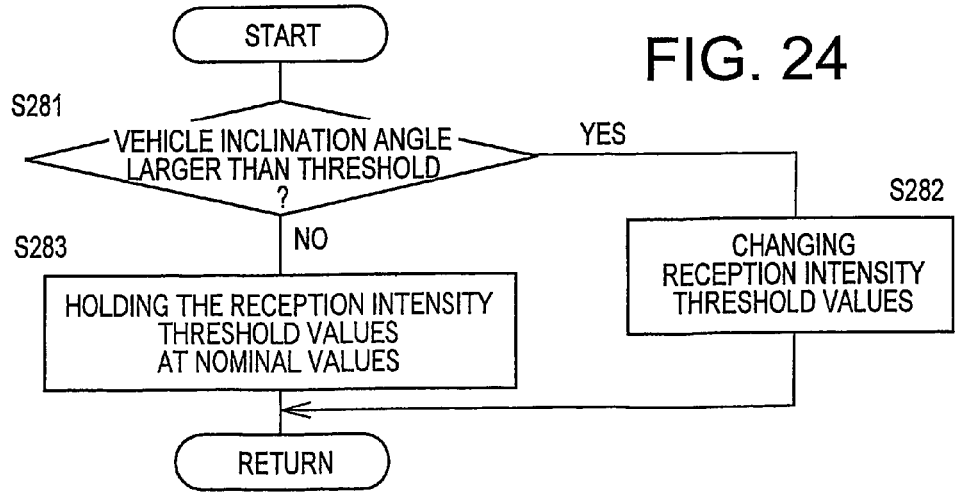
FIG. 24 is a flow chart illustrating an attitude-dependent threshold changing program stored in the first memory portion of a tire-state obtaining apparatus according to a further embodiment of this invention.

The flow chart of FIG. 24 illustrates a program for changing the upper and lower limits of the ranges of the reception intensity of the data map 170, 210. This program is initiated with step S281 to determine whether the vehicle body 8 is excessively inclined, that is, whether the detected angle of inclination of the vehicle body 8 is larger than a predetermined threshold. If an affirmative decision (YES) is obtained in step S281, the control flow goes to step S282 to increase change the upper and lower limits of the ranges of the reception intensity of the data map 170, 210, depending upon the direction of inclination of the vehicle body 8. If the vehicle body 8 has an almost horizontal attitude, that is, if a negative decision (NO) is obtained in step S281, the control flow goes to step S283 to hold the threshold values of the data map at the nominal values. It will be understood that a portion of the wheel-position-data obtaining device 74 assigned to implement steps S281 and S282 constitutes an attitude-dependent communication-environment obtaining portion operable to obtain the environment of communication between the transmitter device 42 and the receiver device 70, 200, on the basis of the attitude of the vehicle body 8. This attitude-dependent communication-environment obtaining portion is considered to be a part of the communication-environment detecting device indicated above.

It is not essential to change in step S282 the amount of change of the threshold values of the data map 170, 210 depending upon the angle of inclination of the vehicle body 8. That is, the threshold values may be increased or reduced by a predetermined amount, depending upon the direction of inclination of the vehicle body 8, when the angle of inclination is larger than the threshold value, namely, when the vehicle body 8 is inclined by an excessively large angle and the threshold values of the data map 170, 210 must be changed.

The receiver device 200 need not be arranged such that the receiver antenna 202 is swung in the normal operating state of the receiver device 200. For example, the receiver antenna 202 is normally held at a predetermined angular position which is determined by the relative position between the receiver antenna 202 and each of the wheels 10–18 and at which the tire information 60 can be received from the corresponding wheel-side device 20–28. Alternatively, the receiver device 200 may be arranged to rotate the receiver antenna 202 by a predetermined angle for changing its orientation, only when the wheel-position data cannot be obtained on the basis of the tire information 50 received by the receiver antenna 202. That is, the antenna-moving device in the form of the antenna-orientation adjusting device is activated only when the wheel-position data could not be obtained.

The wheel-position data can be obtained on the basis of the running condition of the vehicle and a change in the air pressure of the wheel tire. Namely, the tire air pressure of each wheel changes due to a shift of the vehicle load (a shift of the gravity center of the vehicle body) upon braking and/or turning of the vehicle. When the vehicle is braked, the tire air pressure of the front wheels 10, 12 is increased while that of the rear wheels 14, 16 is lowered. When the vehicle is turned during its forward running, the tire air pressure of the wheels located on the outer side of the turning path of the vehicle is increased while that of the wheels located on the inner side is lowered. The wheel from which the tire information 50 has been transmitted can be identified on the basis of the vehicle running condition and the change in the tire air pressure of the wheels 10–16. It is also possible to determine that the wheel whose tire air pressure has not changed upon turning and/or braking of the vehicle is the non-installed wheel 18.

The running condition of the vehicle can be detected by a vehicle-running-condition detecting device. In the illustrated embodiments, the vehicle-attitude detecting device 130 also serves as the vehicle-running-condition detecting device. When the vehicle is turning, the direction of the turning (steering direction of the vehicle) is also detected, to determine the wheels located on the outer side of the turning path and the wheels located on the inner side.

Figure 25:
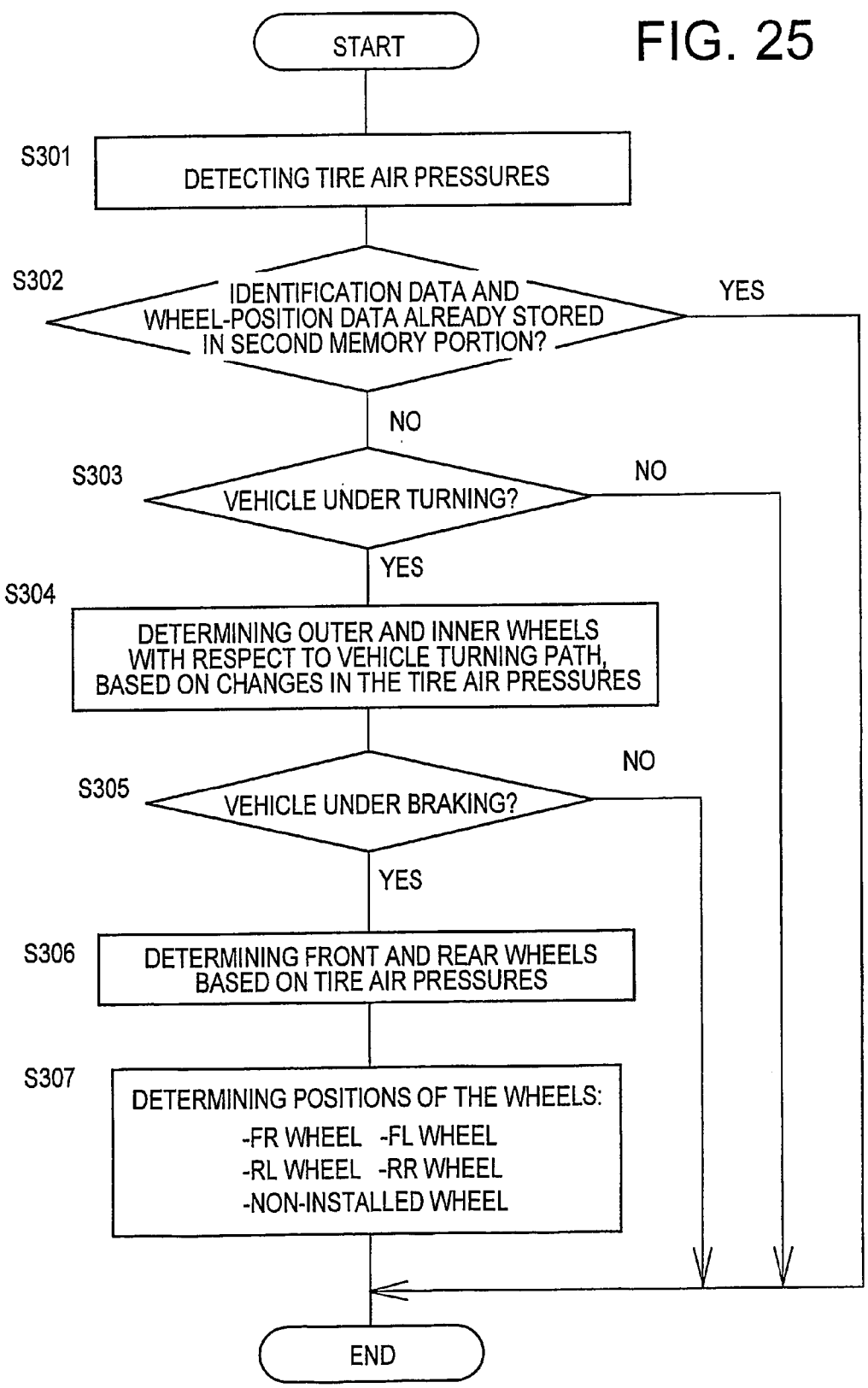
FIG. 25 is a flow chart illustrating a wheel-position-data obtaining program stored in the first memory portion of a tire-state obtaining apparatus according to a still further embodiment of this invention.

The flow chart of FIG. 25 illustrates a program for obtaining the wheel-position data on the basis of the vehicle running condition and the changes in the tire air pressures of the wheels 10–18. The program is initiated with step S301 to obtain the air pressure data 56 included in the tire information 50 received from each of the wheel-side devices 20–28. Step S301 is followed by step S302 to determine whether the identification data and the wheel-position data have already been stored in the second memory portion 142. If an affirmative decision (YES) is obtained in step S302, one cycle of execution of the program is terminated. If a negative decision (NO) is obtained in step S302, the control flow goes to step S303 to determine whether the vehicle is turning during its forward running. If an affirmative decision (YES) is obtained in step S303, the control flow goes to step S304 to determine that the wheels whose tire air pressures have been increased are the wheels located on the outer side of the turning path of the vehicle while the wheels whose tire air pressures have been lowered are the wheels located on the inner side of the turning path. Then, the control flow goes to step S305 to determine whether the vehicle is braked. If an affirmative decision (YES) is obtained in step S305, the control flow goes to step S306 to determine that the wheels whose tire air pressures have been increased are the front wheels 10, 12 while the wheel whose tire air pressures have been lowered are the rear wheels 14, 16.

Step S306 is followed by step S307 to determine the positions of the wheels from which the tire information 50 has been transmitted, on the basis of the results of the determinations made in steps S304 and S306. Namely, the wheel whose tire air pressure has been increased during both the turning and the braking of the vehicle is determined as the front wheel located on the outer side of the vehicle turning path, while the wheel whose tire air pressure has been lowered during both the turning and the braking of the vehicle is determined as the rear wheel located on the inner side of the vehicle turning path. Further, the wheel whose tire air pressure has been increased during the vehicle turning and lowered during the vehicle braking is determined as the rear wheel located on the outer side of the vehicle turning path, while the wheel whose tire air pressure has been increased during the vehicle braking and lowered during the vehicle turning is determined as the front wheel located on the inner side of the turning path. Further, the wheel other than the above-indicated four wheels, that is, the wheel whose tire air pressure remains unchanged during both the vehicle running and the vehicle braking is determined as the non-installed wheel 18.

It is also noted that a fact that the tire air pressure of the rear wheels 14, 16 is increased during acceleration of the vehicle can be utilized to obtain the wheel-position data.

Where the vehicle is not provided with the non-installed wheel 18, the wheel-position data can be obtained on the basis of the tire air pressures of the wheels and the vehicle running condition.

Namely, the wheel whose tire air pressure is comparatively low during both the turning and the braking of the vehicle is the rear wheel located on the inner side of the vehicle turning path, while the wheel whose tire air pressure is comparatively high during both the turning and the braking of the vehicle is the front wheel located on the outer side of the vehicle turning path. The wheel whose tire air pressure is comparatively high during the vehicle turning and comparatively low during the vehicle braking is the rear wheel located on the outer side of the vehicle turning path, while the wheel whose tire air pressure is comparatively low during the vehicle turning and comparatively high during the vehicle braking is the front wheel located on the inner side of the vehicle turning path.

Where the vehicle is provided with the non-installed wheel 18, this wheel can be identified on the basis of a fact that the wheels whose tire air pressures are comparatively high during acceleration of the vehicle are the rear wheels.

It is also possible to inhibit the wheel-position-data obtaining device 74 from obtaining the wheel-position data when it is determined that the vehicle is running on a bad roadway surface. In this respect, it is noted that the amount and speed of a vertical vibrational movement of the vehicle body 8 are relatively large and high during running of the vehicle on the bad roadway surface, so that the tire air pressures of the wheels 10–16 are greatly influenced by the vertical vibrational movement of the vehicle body 8. A running of the vehicle on a bad roadway surface can be detected on the basis of the rate, amount and frequency of change of the wheel speeds.

Figure 26:
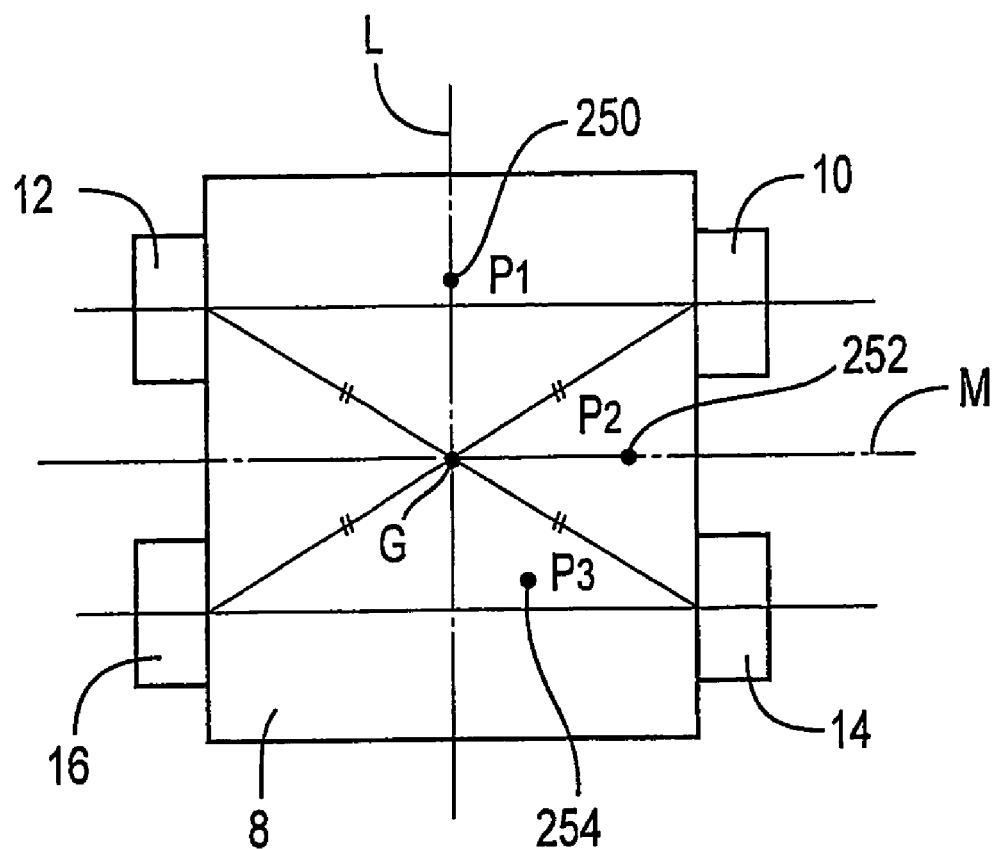
FIG. 26 is a view indicating positions at which a receiver device of a tire-state obtaining apparatus is disposed in further embodiments of this invention.

The receiver devices 70, 200 may be disposed on either the ceiling or the floor of the vehicle body 8. While the receiver devices 70, 200 are located at an almost central portion of the ceiling of the vehicle body 8 in the illustrated embodiments, the receiver devices 70, 200 may be offset from the central portion of the ceiling. In the illustrated embodiments, the receiver device 70 includes the five receiver antennas 80–88, or the receiver device 200 includes the single rotatable receiver antenna 202 having a relatively high degree of directivity, so that these receiver devices 70, 200 may be located at a central portion of the vehicle body 8. Where the receiver device includes a receiver antenna or antennas having a relatively low degree of directivity, such as a planar antenna or antennas, or where the receiver device includes a non-rotatable receiver antenna or antennas having a relatively high degree of directivity, the receiver device is located at a position offset from a center position G of the vehicle body 8, which is spaced from the four wheels 10–16 by the same distance and which is a point of intersection between a longitudinally extending widthwise centerline L of the vehicle body 8 and a laterally extending lengthwise centerline M of the vehicle body 8, as shown in FIG. 26. With the receiver device thus located on the vehicle body 8, the conditions in which the receiver device receives the sets of tire information 60 transmitted from the respective wheel-side devices 20–26 for the wheels 10–16 are not identical with each other, even where the receiver antenna does not have a high degree of directivity. On the basis of the different conditions of reception of the tire information 50, the wheels from which the tire information 50 has been transmitted can be identified.

Where the receiver device includes a receiver antenna 250 located at a position P1 which lies on the longitudinally extending centerline L and which is spaced from the center position G, as indicated in FIG. 26, the receiver device can obtain information which permits distinction between the front wheels 10, 12 and the rear wheels 14, 16. Where the receiver device includes a receiver antenna 252 located at a position P2 which lies on the laterally extending centerline M and which is spaced from the center position G, as also indicated in FIG. 26, the receiver device can obtain information which permits distinction between the right wheels 10, 14 and the left wheels 12, 16. Where the receiver device includes a receiver antenna 254 located at a position P3 spaced from the centerlines L and M, as also indicated in FIG. 26, the receiver device can obtain information which permits distinction of the four wheels 10–16 from each other. The accuracy of the distinction in this case is increased with an increase in the distances of the position P3 from the centerlines L, M.

Where the receiver device includes two or more antennas, these antennas may include the antennas 250 and 252 located at the respective positions P1 and P2. The four wheels from which the respective sets of tire information 50 have been transmitted can be identified on the basis of the outputs of these two antennas 250, 252. Alternatively, the receiver device includes two or more antennas located at respective positions other than the positions P1 and P2.

For example, the first memory portion 140 of the receiver device may store at least one of data maps indicated in FIGS. 27–29. While the intensity of reception of the tire information 50 by each receiver antenna 250, 252, 254 changes with the distance between the receiver antenna and each wheel 10–16, an electromagnetic-wave shielding member if interposed between the receiver antenna and any wheel would increase an apparent distance between the receiver antenna and the wheel in question. In any case, the reception intensity of the receiver antennas 250, 252, 254 are obtained by experimentation, for the individual wheels 10–16.

Where the receiver antenna 250 is located at the position P1 as indicated in FIG. 26, the intensity of reception of the tire information 50 by the receiver antenna 250 from the front wheels 10, 12 is higher than that of the tire information 50 from the rear wheels 14, 16, as indicated in the data map of FIG. 27. However, the receiver antenna 250 has substantially the same intensity of reception of the tire information 50 from the front right wheel 10 and the front left wheel 12, and substantially the same intensity of reception of the tire information 50 from the rear right wheel 14 and the rear left wheel 16.

Where the receiver antenna 252 is located at the position P2 as also indicated in FIG. 26, the intensity of reception of the tire information 50 by the receiver antenna 252 from the right wheels is higher than that of the tire information 50 from the left wheels 12, 16, as indicated in the data map of FIG. 28. Where the receiver antenna 254 is located at the position P3 as also indicated in FIG. 26, the intensity values of reception of the tire information 50 by the receiver antenna 254 from the respective front left wheel 12, front right wheel 10, rear left wheel 16 and rear right wheel 14 decrease in the order of description, as indicated in the data map of FIG. 29.

Where the receiver device of the body-side device 30 includes a plurality of receiver antennas for detecting the states of the wheel tires, at least one of these antennas may be provided by antennas provided for other purposes, such as a vehicle navigator antenna, a broadcasting reception antenna, a cruising control antenna (for detecting a vehicle in front of the vehicle in question), and a roadway-surface-condition detecting antenna. In this case, the number of the tire-state detecting antennas can be reduced, leading to a reduced cost of manufacture of the tire-state obtaining apparatus.

Figure 30:
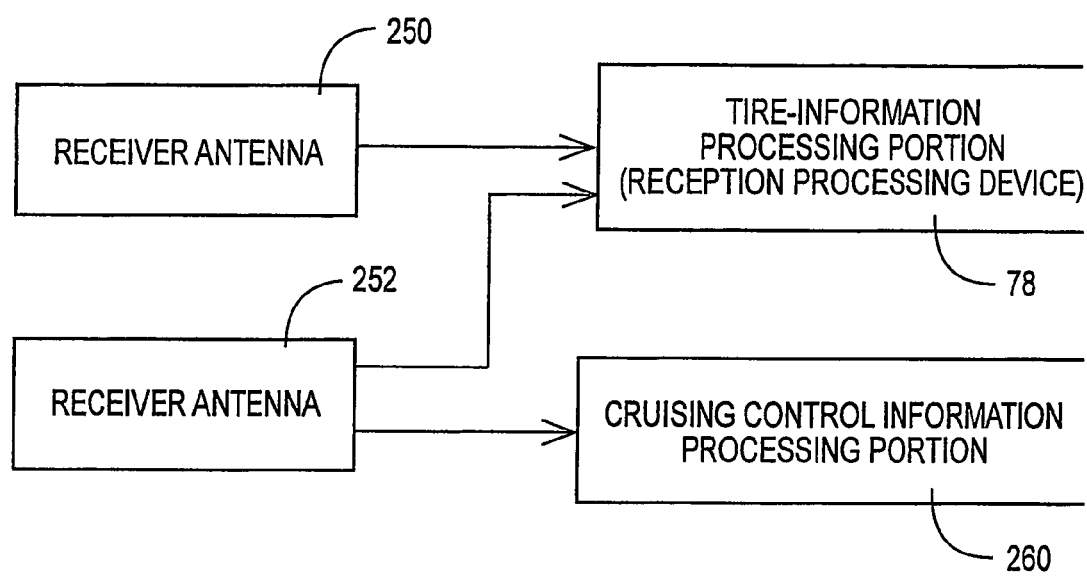
FIG. 30 is a view schematically showing one example of the receiver device of FIG. 26.

For instance, the receiver device may include the receiver antennas 250 and 252 which are connected to a tire-information processing portion serving as the reception processing device 78, as shown in FIG. 30. In this case, the receiver antenna 252 is connected to a cruising control information processing portion 260, which is provided for a cruising control of the vehicle. Namely, the antenna 252 is used commonly for the cruising control of the vehicle and the detection of the states of the wheel tires.

It will be understood that the present invention may be embodied with various other changes, modifications and improvements, such as those described in the DISCLOSURE OF THE INVENTION, which may occur to those skilled in the art. For instance, the data maps 170, 210 which are indicated in FIGS. 12 and 19 by way of example may be modified as needed.

The invention claimed is:

1. A tire-state obtaining apparatus including a plurality of wheel-side devices respectively provided on a plurality of wheels of a vehicle, and a body-side device disposed on a body of the vehicle, said tire-state obtaining apparatus obtaining states of tires of the wheels on the basis of information transmitted from said wheel-side devices, wherein an improvement comprises:

each of said plurality of wheel-side devices includes (a) a tire-state detecting device operable to detect the state of the tire of the corresponding wheel, and (b) a transmitter device operable to transmit a series of tire information including tire-state data indicative of the state of the tire detected by said tire-state detecting device; and said body-side device includes (c) at least one receiver device each provided commonly for at least two of the transmitter devices of said plurality of wheel-side devices and operable to receive sets of the tire information transmitted from said at least two transmitter devices, and (d) a wheel-position-related-data obtaining device operable to obtain wheel-position-related data relating to positions of said wheels, on the basis of conditions in which said at least one receiver device receives the sets of tire information transmitted from said transmitter devices.

2. A tire-state obtaining apparatus according to claim 1, wherein said tire information includes identification data identifying the wheel corresponding to the transmitter device from which said tire information has been transmitted, and said wheel-position-related-data obtaining device includes a wheel-position-related data memory portion for storing said identification data included in said tire information and said wheel-position-related data relating to the position of the wheel corresponding to said transmitter device from which said tire information has been transmitted, such that said identification data and said wheel-position-related data are correlated with each other.

3. A tire-state obtaining apparatus according to claim 1, wherein said wheel-position-related-data obtaining device obtains said wheel-position-related data on the basis of the conditions in which said at least one receiver device receives the sets of tire information and rotating states of said wheels.

4. A tire-state obtaining apparatus according to claim 1, wherein said transmitter device transmits said tire information for a length of time required for at least one full rotation of the corresponding wheel, and said wheel-position-related-data obtaining device obtains said wheel-position-related data on the basis of the condition in which said at least one receiver device receives said tire information transmitted from said transmitter device for said length of time.

5. A tire-state obtaining apparatus according to claim 1, wherein each of said at least one receiver device includes at least one receiver antenna, and said body-side device further includes an antenna-moving device operable to move at least one of said at least one receiver antenna.

6. A tire-state obtaining apparatus according to claim 5, wherein said antenna-orientation adjusting device includes a relative-position changing device operable to change a relative position between said receiver antenna and each of said at least two of said transmitter devices, and a changing-device control portion operable to control said relative-position changing device.

7. A tire-state obtaining apparatus according to claim 5, wherein said antenna-moving device includes a moving-state changing portion operable to change a state of movement of said receiver antenna, on the basis of rotating states of the wheels.

8. A tire-state obtaining apparatus according to claim 7, wherein said adjusting-state changing portion is operable to change at least one of a speed and a manner of changing a relative position between said receiver antenna and each of said at last two of said transmitter devices.

9. A tire-state obtaining apparatus according to claim 5, wherein said antenna-moving device includes a moving-state changing portion operable to change a state of movement said receiver antenna, when said wheel-position-related-data obtaining device fails to obtain said wheel-position related data of at least one of the wheels which corresponds to at least one of said at least two of the transmitter devices.

10. A tire-state obtaining apparatus according to claim 1, wherein each of said at least one receiver device includes one receiver antenna, and said body-side device further includes an antenna-moving device operable to move said one receiver antenna.

11. A tire-state obtaining apparatus according to claim 1, wherein at least one of said at least one receiver device includes a plurality of receiver antennas, and said body-side device includes a receiver-antenna selecting device operable to select one of said plurality of receiver antennas, and a selected-antenna-dependent wheel-position-related-data obtaining portion operable to obtain said wheel-position-related data on the basis of a condition in which the receiver antenna selected by said receiver-antenna selecting device receives said tire information.

12. A tire-state obtaining apparatus according to claim 11, wherein said plurality of receiver antenna are provided for said at least two of the transmitter devices, respectively.

13. A tire-state obtaining apparatus according to claim 11, wherein said receiver-antenna selecting device includes a highest-reception-intensity-antenna selecting portion operable to select one of said plurality of receiver antennas which has a highest intensity of reception of said tire information.

14. A tire-state obtaining apparatus according to claim 1, wherein at least one of said at least one receiver device includes a plurality of receiver antennas provided for said at least two of the transmitter devices, respectively, and said body-side device includes a highest-reception-intensity-antenna selecting portion operable to select one of said plurality of receiver antennas which has a highest intensity of reception of said tire information.

15. A tire-state obtaining apparatus according to claim 1, wherein at least one of said at least one receiver device includes one receiver antenna which has different positional relationships with the at least two wheels provided with said at least two of said transmitter devices, respectively.

16. A tire-state obtaining apparatus according to claim 1, wherein at least one of said at least one receiver device includes a plurality of receiver antennas and a tire-information processing portion operable to process sets of said tire information received by said plurality of receiver antennas, and at least one of said plurality of antennas includes at least one common antenna connected to both of said tire-information processing portion and another processing portion which is operable to process information different from said tire information.

17. A tire-state obtaining apparatus according to claim 1, wherein said wheel-position-related-data obtaining device is operable to obtain said wheel-position-related data in a selected one of different operation modes, and includes an operation-mode changing portion which is operable, when said wheel-position-related-data obtaining device fails to obtain said wheel-position-related data for at least one of said wheels in one of said different operation modes, to change said one mode to another mode.

18. A tire-state obtaining apparatus according to claim 17, wherein said operation-mode changing device includes at least one of: a sampling-number changing portion operable to change a number of samples of said tire information to be received by at least one of said at least one receiver device; a threshold changing portion operable to change threshold values used to obtain said wheel-position-related data; a selected-wheel-data obtaining portion operable to obtain said wheel-position-related data for selected at least one of said wheels; an inhibiting portion operable to inhibit said wheel-position-related-data obtaining device from obtaining said wheel-position-related data; an amplifier-gain changing portion operable to change an amplifying gain of an amplifier included in at least one of said at least one receiver device; an antenna adjusting portion operable to adjust at least one receiver antenna included in at least one of said at least one receiver device; a reception-sensitivity changing portion operable to change a reception sensitivity of each of said at least one receiver device; and a filtering-mode changing portion operable to change a mode of operation of a filter included in at least one of said at least one receiver device.

19. A tire-state obtaining apparatus including a plurality of wheel-side devices respectively provided on a plurality of wheels of a vehicle, and a body-side device disposed on a body of the vehicle, said tire-state obtaining apparatus obtaining states of tires of the wheels on the basis of information transmitted from said wheel-side devices, wherein an improvement comprises:

each of said plurality of wheel-side devices includes (a) a tire-state detecting device operable to detect the state of the tire of the corresponding wheel, and (b) a transmitter device operable to transmit a series of tire information including tire-state data indicative of the state of the tire detected by said tire-state detecting device; and said body-side device includes (c) a receiver device to receive sets of the tire information transmitted from the respective transmitter devices, (d) a communication-environment detecting device operable to detect an environment of communication between said plurality of wheel-side devices and said body-side device, and (e) a wheel-position-related-data obtaining device operable to obtain wheel-position-related data relating to positions of said wheels, on the basis of said environment of communication detected by said communication-environment detecting device, and on the basis of conditions in which said receiver device receives the sets of tire information transmitted from the respective transmitter devices.

20. A tire-state obtaining apparatus according to claim 19, wherein said communication-environment detecting device includes a vehicle-attitude detecting portion operable to detect an attitude of the vehicle, and an attitude-dependent communication-environment obtaining portion operable to obtain, as said environment of communication, a variation of an actual positional relationship between said receiver device and said transmitter devices from a nominal relationship therebetween, on the basis of the attitude of the vehicle detected by said vehicle-attitude detecting portion.

21. A tire-state obtaining apparatus according to claim 19, wherein said communication-environment detecting device includes a vehicle-environment detecting portion operable to detect an environment of the vehicle.

22. A tire-state obtaining apparatus according to claim 19, wherein said operation-mode changing device includes at least one of: an amplifier-gain changing portion operable to change an amplifying gain of an amplifier included in said receiver device; an antenna adjusting portion operable to adjust at least one receiver antenna included said receiver device; a reception-sensitivity changing portion operable to change a reception sensitivity of said receiver device; a filtering-mode changing portion operable to change a mode of operation of a filter included in said receiver device; a threshold changing portion operable to change threshold values used to obtain said wheel-position-related data; a sampling-number changing portion operable to change a number of samples of said tire information to be received by said receiver device; a selected-wheel-data obtaining portion operable to obtain said wheel-position-related data for selected at least one of said wheels; and an inhibiting portion operable to inhibit said wheel-position-related-data obtaining device from obtaining said wheel-position-related data.

23. A tire-state obtaining apparatus including a plurality of wheel-side devices respectively provided on a plurality of wheels of a vehicle, and a body-side device disposed on a body of the vehicle, said tire-state obtaining apparatus obtaining states of tires of the wheels on the basis of information transmitted from said wheel-side devices, wherein an improvement comprises:

each of said plurality of wheel-side devices includes (a) a tire-state detecting device operable to detect the state of the tire of the corresponding wheel, and (b) a transmitter device operable to transmit a series of tire information including tire-state data indicative of the state of the tire detected by said tire-state detecting device; and said body-side device includes (c) a receiver device to receive sets of the tire information transmitted from the respective transmitter devices, (d) a wheel-position-related-data obtaining device operable to obtain wheel-position-related data relating to positions of said wheels, on the basis of conditions in which said receiver device receives sets of the tire information transmitted from the respective transmitter devices, (e) a communication-environment detecting device operable to detect an environment of communication between said plurality of wheel-side devices and said body-side device, and (f) an operation-mode changing portion operable to change a mode of operation of said wheel-position-related-data obtaining device, on the basis of said environment of communication detected by said communication-environment detecting device.

24. A tire-state obtaining apparatus according to claim 23, wherein said communication-environment detecting device includes a vehicle-attitude detecting portion operable to detect an attitude of the vehicle, and an attitude-dependent communication-environment obtaining portion operable to obtain, as said environment of communication, a variation of an actual positional relationship between said receiver device and said transmitter devices from a nominal relationship therebetween, on the basis of the attitude of the vehicle detected by said vehicle-attitude detecting portion.

25. A tire-state obtaining apparatus according to claim 23, wherein said communication-environment detecting device includes a vehicle-environment detecting portion operable to detect an environment of the vehicle.

26. A tire-state obtaining apparatus including a plurality of wheel-side devices respectively provided on a plurality of wheels of a vehicle, and a body-side device disposed on a body of the vehicle, said tire-state obtaining apparatus obtaining states of tires of the wheels on the basis of information transmitted from said wheel-side devices, wherein an improvement comprises:

each of said plurality of wheel-side devices includes (a) a tire-state detecting device operable to detect the state of the tire of the corresponding wheel, and (b) a transmitter device operable to transmit a series of tire information including tire-state data indicative of the state of the tire detected by said tire-state detecting device; and said body-side device includes (c) a receiver device to receive sets of the tire information transmitted from the respective transmitter devices, (d) a vehicle-running-condition detecting device operable to detect a running condition of the vehicle, and (e) a wheel-position-related-data obtaining device operable to obtain wheel-position-related data relating to positions of said wheels, on the basis of the running condition of the vehicle detected by said vehicle-running-condition detecting device, and on the basis of at least one of said state of the tire detected by said tire-state detecting device and a change of the detected state of the tire.

27. A tire-state obtaining apparatus according to claim 26, wherein said tire information further includes air-pressure data indicative of an air pressure of said tire, and said wheel-position-related-data obtaining device includes an air-pressure-dependent wheel-position-related-data obtaining portion operable to obtain said wheel-position-related data on the basis of at least one of the air pressure of the tire indicated by said air-pressure data and a change of said air pressure.

28. A tire-state obtaining apparatus according to claim 26, wherein said vehicle-running-condition detecting device includes at least one of an accelerating-state detecting portion operable to detect an accelerating state of the vehicle, and a turning-state detecting portion operable to detect a turning state of the vehicle.

* * * * *